(12) United States Patent
Ambrose

(10) Patent No.: US 8,069,058 B2
(45) Date of Patent: *Nov. 29, 2011

(54) OBTAINING, POSTING AND MANAGING HEALTHCARE-RELATED LIENS

(75) Inventor: Stephen Ambrose, Richmond, VA (US)

(73) Assignee: Stephen Ambrose, Richmond, VA (US)

( * ) Notice: Subject to any disclaimer, the term of this patent is extended or adjusted under 35 U.S.C. 154(b) by 739 days.

This patent is subject to a terminal disclaimer.

(21) Appl. No.: 12/127,023

(22) Filed: May 27, 2008

(65) Prior Publication Data

US 2009/0299764 A1    Dec. 3, 2009

(51) Int. Cl.
G06Q 50/00    (2006.01)

(52) U.S. Cl. .................................. 705/2; 705/3; 705/4

(58) Field of Classification Search .................. 705/2–3, 705/4
See application file for complete search history.

(56) References Cited

U.S. PATENT DOCUMENTS

2001/0041993 A1 * 11/2001 Campbell ........................ 705/4
2007/0282735 A1 * 12/2007 Schuebert ...................... 705/38

* cited by examiner

Primary Examiner — Gerald J. O'Connor
Assistant Examiner — Minnah Seoh

(57) ABSTRACT

A system and method for health providers to assert their rights of fair trade and financial interest in optimizing revenue and full fee collection for bills relating to their rendered services in cases of patients, who receive treatment and subsequently utilize related health provider's billings as a part of an injury related to a tort or injury claim.

A healthcare-related lien network, which is comprised of a computer network, various lien-network members and an owning entity of the network, whom all work together to establish, monitor, recognize and effect payment of a contingency-based, health provider—patient lien, where the patient or a patient's legal representative has billed the health provider's billings to a payer, other than a health insurer, as part of a patient's injury claim.

The system and method relating to the healthcare-related lien network has business-to-business and business-to-consumer variations, offering health providers the ability to recover monies, which would have normally been written-off or otherwise uncollected.

Additionally, there are payment methods associated with the healthcare-related lien network, allowing the owning entity of the lien network as well as non-health provider members of the lien network, to profit by properly recognizing and dispersing monies relating to satisfying an existing health provider—patient lien, held within the healthcare-related lien network.

16 Claims, 10 Drawing Sheets

OBTAINING, POSTING AND MANAGING HEALTHCARE-RELATED LIENS

BACKGROUND OF THE INVENTION

As the health insurance industry reduces their health provider reimbursement rates to improve profitability and growth, today's health care industry, linked into that very system, needs growth in their revenue and return.

To this point, it is important that physicians, hospitals health care service businesses and related companies (herein "health providers"), identify and capitalize on all opportunities to maximize compensation from services provided to their respective patients.

Normally, when a patient receives treatment and/or services from a health provider, either the patient and/or their health insurance company, if applicable, may be billed; subsequently, the patient and/or their insurance has the responsibility to pay the health provider for the rendering of these services.

When the patient has health insurance, the health provider that contracts with the patient's health insurance company has the obligation to accept contracted reimbursement rates from the patient's health insurance; these contracted rates may typically be lower than the health provider's normal, full charges for their billed services.

The patient who does not have health insurance is known as a self-pay patient; in turn, the health provider does not have an obligation to reduce their fees and can bill the patient at their normal, full rates. However, many self-pay patients cannot afford normal health provider fees and thus take on additional medical-related debt. This may result in the health provider deciding to write off a portion of their bill. This is a common practice in hospitals, lower income communities and the like.

However, in certain patient financial circumstances there may exist a responsible payment party, which is not health insurance, yet constitutes a payment source for the provision of paying the health provider's bills. The responsible payment party may be financially responsible for the individual, group or business entity, deemed to have caused the injuries or health problems (herein "tortfeasor"), relating to the patient's need and receipt of injury-related health care services. Additionally, some responsible payment parties are solely responsible for the patient and their injuries.

Such cases for responsible payment party involvement may represent but not be specifically limited to patients seeking care from injuries stemming from assault, battery, infliction of mental distress, medical-malpractice, environmental causes, personal injury, motor vehicle accidents, pharmaceutical liability, poisoning, toxicity, slips and falls, product liability and many others.

Within many state laws, there exists a provision known as the Collateral Source Rule. This is a common law rule of evidence, which allows a patient who has been injured (herein "injured party") and/or their legal representative (i.e. attorney) where applicable, to submit health provider bills to, and receive compensation from responsible payment parties, including but not limited to first party health riders and/or third party liability insurance payers—at full fee amounts of compensation, if applicable, with either or both. A first party payer may be the injured party's own medical benefits/payments rider on their own auto policy but may also include similar first party medical payment riders on non-auto policies as well.

It is important to note that even if the health provider's bills were previously paid by the patient's health insurance company, the responsible payment party is in most cases, cannot waive their obligation to pay the submitted medical billings, if the billings constitute part of an injury claim.

The payment to the injured party from a first and/or third party payer may be duplicative or higher in amount than what the Health provider receives from the patient/injured party's health insurance or through a reduced-fee arrangement with a self-pay patient.

Furthermore, when an injured party and/or their attorney files a claim against a tortfeasor and/or their representing third party liability insurance, the financial valuation of the injury claim may derive part or much of its value from utilizing a multiple of the actual injured party's medical services rendered and bills thereby related.

This is important in that health providers are typically, not contracted with first and/or third party payers; thereby not necessarily limiting compensation as is the case with health insurance contracts. Moreover, this may allow the health provider a better opportunity to receive full fee compensation for the provision of their health care services, a benefit not typically realized by the health provider.

When a patient visits a health provider, the applicability and disclosure of a first and/or third party responsible payer may not always be apparent to either the patient and the health provider, or both. Therefore, there exists a problem with the identification, timely knowledge, subsequent billing of, and a patient's future collection from situations where there is an applicable first and/or third party payers, who have been submitted health provider billings by the patient or their legal representative.

When patients who are injured parties, file a claim against tortfeasors and/or their responsible payers, wherein their financial compensation comes in part from utilizing medical billings, the health providers themselves may lose an opportunity to be compensated at their normal fee rate.

These and other drawbacks exist with known billing practices.

SUMMARY OF THE INVENTION

It is an object of this invention to provide a system and method for establishing, organizing, monitoring and subsequently collecting upon health provider—patient liens.

The system is collectively known as a healthcare-related lien network, and has various embodiments comprised of a database, server(s), members of the lien network, non-member parties, as well as an owning entity of the lien network. There are multiple variations and embodiments of both the healthcare-related lien network and methods of payment dispersal relating to the health provider—patient lien, obligations of related parties and if indicated and payment of monies bound to the lien.

The health provider—patient lien is a legal, financial instrument for health providers to legally assert their rights to monies, which come as a result of the health provider's patient and/or the patient's legal representative utilizing and being financially compensated from the billings of the provider, as a part of a patient's related tort or injury claim settlement.

Specifically, the monies attached to the lien ("lien monies") are the amounts existing between a health provider's full fee for services and a lesser amount, including no payment, if collected by the health provider from the patient and/or the patient's health insurance, if applicable.

One embodiment of the healthcare-related lien network represents a business-to-business model, where members of the lien network include health providers and a lien effecter; the lien effecter being a party other than a health provider, who has access to the payment of monies relating to a patient's billings and health records or collection of the settlement proceeds of such, as part of an injury claim.

An injury claim, consistent to all embodiments, represents an individual, group or class action tort, relating to assault, battery, infliction of mental distress, medical-malpractice, motor vehicle accident, personal injury, poisoning, toxicity, wrongful death, slips and falls, product liability, pharmaceutical liability and any action from a tortfeasor that is at least deemed to have caused injury to an individual or group, where the injury required the rendering of health-related services.

The health provider member has a patient, prior to treatment and services, sign a lien, whereby the activation and viability of the lien rests on the contingency of a patient's future actions, with respect to their use of the health provider's billings.

After the patient signs the lien, the health provider, as a member of the healthcare-related lien network, establishes a patient profile account within the lien network, by sending the patient's demographic and related health information electronically, along with an electronic copy of the lien agreement to the lien network. Subsequently, the database of the lien network assembles and organizes the patient lien and related information, finalizing the patient's profile.

Once the health provider member submits the lien and information to the lien network, it assigns rights of collection to the lien network exclusively.

In variations of the business-to-business embodiment, the lien effecter, a user who subscribes to the lien network, may be either a liability insurance company, who represents the financial responsibilities of a tortfeasor in an injury claim, a defendant in a tort claim solely, an attorney, representing a plaintiff in a injury claim or a plaintiff in a tort claim solely, whereby tort claim and injury claim are synonymous.

The lien effecter is a member of the lien network and subsequently learns about the existence of a lien, through their membership and use of the lien network as a subscriber; wherein the lien specifically relates to an injury claim that the lien effecter is a part of.

Once the lien's applicability is known, the lien effecter, as a lien network member and subscriber, is obligated by terms of membership, to pay any owed lien monies, which would otherwise be a part of the injury claim's settlement; whereby the related payment method would consist of the lien effecter making payment of lien monies, either to the owning entity of the lien network, or to the health provider.

The lien monies may also be divided in payment to the owning entity of the lien network, the health provider member and optionally back to the lien effecter themselves. In any manner, once the lien monies are paid and dispersed accordingly, the lien and its legal obligation is satisfied.

Another embodiment of the healthcare-related lien network represents a business-to-consumer model, where members of the lien network include health providers, a responsible payer and an owning entity of the lien network.

The health provider member has a patient, prior to treatment and services, sign a lien, whereby the activation and viability of the lien rests on the contingency of a patient's future actions.

After the lien is signed, the health provider, as a member of the lien network, establishes a patient profile account within the lien network, by sending the patient's demographic and related health information electronically, along with an electronic copy of the lien agreement to the lien network. The information is sent through the lien network's server and subsequently, the database of the lien network assembles and organizes the patient lien and related information, finalizing the patient's profile.

Once the health provider member submits the lien and information to the lien network, it assigns rights of collection to the lien network exclusively.

In variations of the business-to-consumer embodiment, the responsible payment party, a user of the lien network, may be either a liability insurance company, who represents the financial responsibilities of a tortfeasor in an injury claim or a first party health rider on the injured party's own insurance policy, where the rider covers injuries for the injured party regardless of fault.

The responsible payer, as a member of the healthcare-related lien network, submits injury claim information to the lien network's designated claim server; the claim information includes the injured party's name and demographic information, as well as whether or not the injured party was paid on the injury claim by the responsible payer, including any amounts of payment. Subsequently, the database of the lien network assembles and organizes the injury claim information.

The database of the healthcare-related lien network, upon receiving and storing both the lien and claim data, compares both sets of data, determining if there is a match between the patient in the lien data and the injured party in the claim data.

If there is a match, the lien network compares the amount of injured party payment with the owed lien monies from the health provider member; subsequently, when an owed amount relating to the provision of the health provider—patient lien is calculated, the lien network notifies the patient, who is also the injured party in an injury claim.

The patient, who is also the injured party, is subject, through the method relating to the business-to-consumer model, to repay the owed lien monies from their settlement. Thereafter, the patient makes such payment to the owning entity of the healthcare-related lien network.

After collection from the patient, the owning entity of the healthcare-related lien network has an obligation to repay the lien monies to the health provider member as well as retain a portion of those monies as compensation for the previous assignment of the collection of the lien. There is an optional payment from a portion of the lien monies, which may be made from the owning entity of the healthcare-related lien network to the responsible payment party.

In any manner, once the lien monies are paid and dispersed accordingly, the lien and its legal obligation is satisfied.

DETAILED DESCRIPTION OF THE EMBODIMENTS

Figure 1:
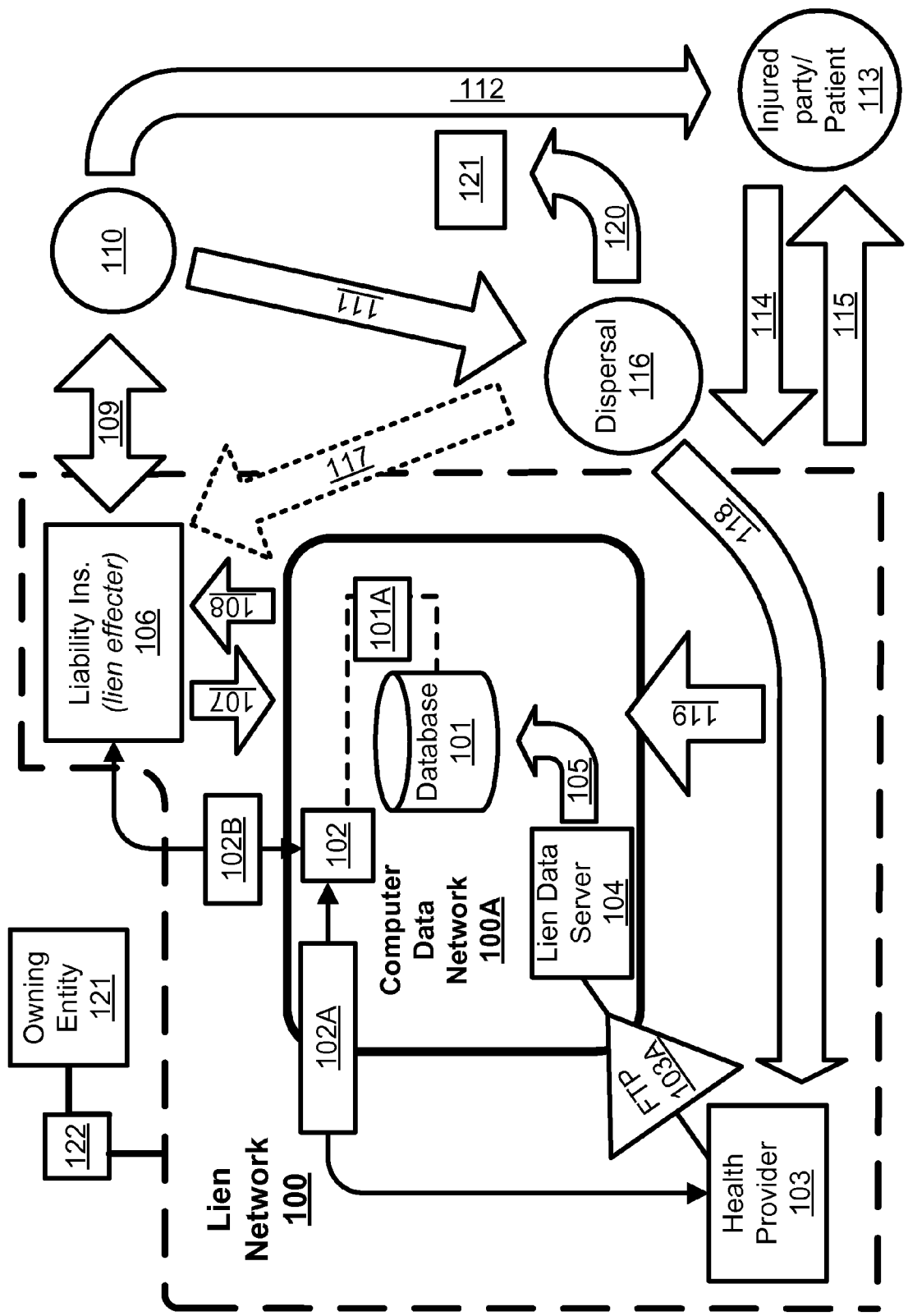
FIG. 1 is an illustration of a healthcare-related lien network via a business-to-business model with a liability insurer as lien effecter, as per an aspect of an embodiment of the invention.

The invention will now be described in detail with reference to the drawing figures, which are provided as illustrative examples so as to enable those skilled in the art to make and use the invention. Notably, the drawing figures and accompanying text (and examples) provided herein may not specifically limit the scope of the invention. In the drawing figures, like components, services, applications, and operations are designated by like reference numerals throughout the various drawing figures. Where certain elements of the invention can be partially or fully implemented using known components, only those portions of such known components that may be necessary for an understanding of the present invention may be described, and detailed descriptions of other portions of such known components may be omitted so as not to obscure the invention. Further, the invention's present and future known equivalents to the components referred to herein by way of illustration.

According to FIG. 1, a first embodiment of the system and method shows a business-to-business model reflecting an owning entity 121 of a member-based lien network 100, both linked through a legal, proprietary relationship 122. Members of the network 100 may comprise health providers 103 and liability insurance companies 106.

Through membership in the lien network 100, both members 103 and 106 are linked contractually to each other, as well as to the provisions, obligations and rules of membership of the lien network, including, but not limited to negotiated reimbursement rates, fees, actions and consequences, etc. set forth by the owning entity of the lien network 121.

Health provider members 103 may comprise, without being limited to, single or multiple physician practices, hospitals, outpatient clinics, medical testing centers, lab services, ambulatory services, radiological services and those entities, which provide medical equipment and pharmaceutical products as part of interaction and related care provider to and for patients; additionally, any single or multiple non-medical health providers of health-related treatment and/or services.

Liability insurance company members 106 represent all types of insurance companies, who, through their insurance policies, are financially liable when their policyholders become tortfeasors in an injury claim; whereby, policyholders are inclusive of, but not solely limited to individuals, businesses, associations, public companies and organizations deemed responsible for actions causing injury to a separate party.

Members 103 and 106 may represent an individual and/or plurality of legally organized and recognized entities within the health care and liability insurance industries—be they sole proprietorship, corporation, partnership, limited liability company, membership, association or other legally-recognized consortium.

Members 103 and 106 may or may not be charged a membership fee for being in the lien network 100.

Specifically, lien network 100 comprises a computer data network 100A, with a relational database 101, ASP based website and related server(s) 102, connection to transmit information between database and website 101A, a lien data server 104 as well as related connections therein.

Computer data network 100A may include, but is not limited to, any one or more of, for instance, the Internet, an intranet, a PAN (Personal Area Network), a LAN (Local Area Network), a WAN (Wide Area Network), a SAN (Storage Area Network), or a MAN (Metropolitan Area Network).

Database 101 may be one or more databases, including, or interfacing to, for example, an Oracle™ relational database sold commercially by Oracle Corporation. Other databases, such as Informix™, DB2 (Database 2) or other data storage or query formats, platforms, or resources such as OLAP (On Line Analytical Processing), SQL (Standard Query Language), a SAN (storage area network), Microsoft Access™ or others may also be used, incorporated, or accessed into the invention.

Server 104 receives, communicates with and stores lien data from health provider members 103. Moreover, server 104 may comprise one or more servers in number, including a workstation running Microsoft Windows™ NT™, Microsoft Windows™ 2000, Unix, Linux, Xenix, IBM, AIX™, Hewlett-Packard UX™, Novell Netware™, Sun Microsystems Solaris™, OS/2™, BeOS™, Mach, Apache, OpenStep,™ or other operating system or platform.

Health provider member 103 sends lien data in a secure fashion through FTP communication 103A or other similar secure means to the computer data network's lien data server 104, designated to receive and store information solely from health provider member.

Lien data may include, but not be solely limited to health provider member identity, contact and related identifying information; the health provider's patients, including identifying information for the patients such as, but not solely limited to patient's identity, related private health information, billable services, dates of injury-related treatment, existence of a health provider—patient lien or other legally binding agreements, amounts previously paid on treatment and related services, patient health insurance information—if applicable, HIPAA authorization, health related claim forms, a contingency-based health provider—patient lien, allowing for the collection of differential monies, identification of a registered patient's injury cause and attorney.

Lien data may also be known as "lien information", "patient claim information", "data" or "information" in relation to appropriate context.

In an alternative implementation, lien data from the health provider member 103 may be provided to computer data network 100A via transfer of media including, for example, Blu-Ray disk, DVD, CD-ROM, memory stick, tape, disk, and/or other suitable removable media, wireless means, as well as paper records.

Lien data server 104 receives lien information from health provider member 103 via 103A; subsequently, 103A allows for member 106 to evaluate information it has uploaded for determining completeness and accuracy of the lien data housed in server 104.

Moreover, lien data server 104 uploads the received information independently and through secure means per 105 to the computer data network's relational database 101.

The uploaded information from lien data server 104 to the relational database 101 is sent in whole or partial form, depending on the use of analytics, software and specific data per specificity by relational database 101 as determined by the needs of computer data network 100A.

Liability insurance company members 106, receive as a part of normal business, injury-related claims, whereby a policyholder of the liability insurance company may be responsible for the cause of injury to the injured party. The liability insurance company has a responsibility to protect its policyholder in such matters financially.

The injury claim submitted by the injured party 113 to the liability insurance company member 106 may contain bills from health-related care, treatment and services, given to the injured party/patient 113 by a health provider member 103.

Moreover, the bills related to these health services may be included within a financial instrument, such as a contingency-based health provider—patient lien, allowing for collection of owed differential monies to health provider member 103, made between the patient/injured party 113 and a health provider member 103, prior to the rendering of services. The lien, already submitted by the health provider member 103 through 103A, may be held by the lien network 100, whereby the provider may assign rights to collection of the lien to the owning entity of the lien network 121, when placing the lien in the lien network's domain.

In 107, liability insurance company member 106 may query database 101; the query is made through ASP site 102 via 102B. There may or may not be a charge for liability company member 106 to pay the owning entity of the lien network 121, for the query.

The query allows the liability insurance company member 106 to determine a match of identity between the injured party 113 to any individual patient held within the database, related matched medical services and billings, and if those billings were included under a lien between the health provider member 103 and injured party/patient 113 at a time before such health services were rendered.

The computer data network 100A has an ASP based website and related server(s) 102, allowing members 103 and 106 to connect into the website through 102A and 102B respectfully, to a pre-arranged, evolving set of data and/or reports, as so allowed by the computer data network 100A, through the use of a GUI interface 101A or similar means, to pull only specific information kept at relational database 101. This may include, but is not limited to, need for additional information, changes in information, open and closed lien claims as well as current status of such.

Any payment for query 107 is not contingent upon receiving a match of information from database 101; furthermore, response information 108 received by the liability insurance company member 106 by the computer data network 100A may or may not show a match of identity.

However, when lien data held by the database 101 matches up with injury claims data held by the liability insurance company 106, the liability insurance company 106 may, as shown in 109, use the lien data with inclusive patient lien and medical billing information to better negotiate, reduce or eliminate payment for injury claims by leveraging existing owed differential monies under an existing lien against monies sought through a liability claim by injured party 113, whereby the injured party is also a patient 113 of the health provider 103.

When the injured party 113 and liability insurance company member 106 have negotiated the claim to an agreed amount 110, the liability insurance company member 106, now deemed the lien effecter, honors the existing lien between health provider member 103 and patient 113; furthermore, alerting the injured party/patient in 113 that the lien amount portion of the claim 111 will be paid through dispersal 116 to the health provider 103 and other parties, with the remaining monies remitted to the injured party/claimant 113.

In 110, there exists an agreement between the liability insurance company member 106 and the injured party 113, a judgment or award from a court, inclusive of setting aside appropriate lien monies, with the liability insurance company member 106 honoring and paying the lien amount 111 for eventual dispersal 116.

If the claim submitted from the injured party 113 is successfully dismissed by the liability insurance company 106 or a court rules in favor of the liability insurance company member 106 with no stipulation of payment to the injured party/patient 113, the lien obligation and related monies may no longer be payable by the liability insurance company member 106 to the health provider member 103 or any other related parties of the lien network 100.

In 112, the injured party/patient 113 is paid by the liability insurance company member 106 for the injury claim, excepting aforementioned and set aside lien monies 111, by the liability insurance company member 106.

In 116, the liability insurance company member 106 as lien effecter, arranges and thereby disperses the lien monies, that is, owed differential monies related to the recognized health provider—patient lien, specifically for redistribution within provisions of the lien network 100.

Prior to remittance of money to health provider member 103, the liability insurance company member 106, as lien effecter, through a negotiated arrangement per membership in and subscription to, the lien network 100, may take a pre-negotiated portion of lien monies 117 as part of compensation, due for enforcing and collecting upon the lien for health provider member 103.

Another dispersal of lien monies in 120 may be given made to the owning entity 121 of lien network 100.

In 118, the liability insurance company member 106 disperses a payment to health provider member 103, which constitutes a portion of lien monies from 111.

Per 119, the computer data network 100A of the lien network 100 is made aware of both submission of payment by liability insurance company member 106 in 118, as well as receipt of payment by health provider member 103, through each member's responsibility to the lien network 100.

Additionally in 119, the liability insurance company member 106 verifies to the computer data network 100A of the lien network 100, that optional compensation payment 117 and payment to owning entity in 120 is in keeping with agreed upon rates within the provisions of the lien network 100.

In 114, the injured party/patient 113 requests verification from the lien network 100, that liability insurance company member 106 did in fact make payment related to lien per monies set aside in 111; moreover, that such payment 118, was received by health provider member 103.

Additionally, the request of 114 covers both liability insurance company member's compensation monies in 117 as well as owning entity compensation monies in 120.

In 115, a verification report from the lien network satisfies the provisions and request of 114. Furthermore, that the amounts in 117, 118 and 120 equal the amount of lien monies set aside in 111, as so agreed to between liability insurance company member 106 and injured party/patient 113 in 110.

Figure 2:
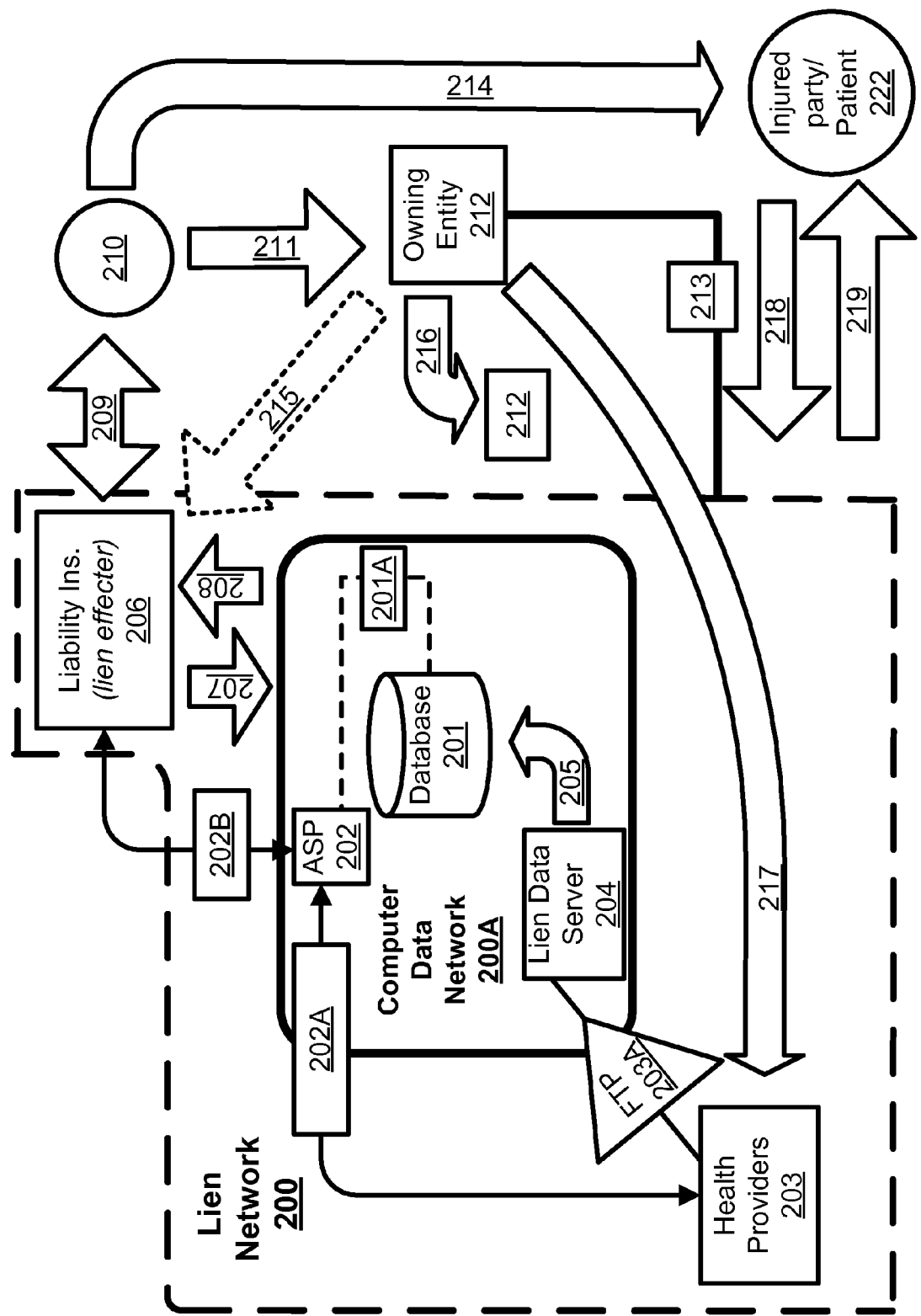
FIG. 2 is another illustration of a healthcare-related lien network via a business-to-business model with a liability insurer as lien effecter, as per an aspect of an embodiment of the invention.

According to FIG. 2, a variation of the first embodiment of the system and method shows a business-to-business model reflecting an owning entity 212 of a member-based lien network 200, both linked through a legal, proprietary relationship 213. Members of the network 200 may comprise health providers 203 and liability insurance companies 206.

Through membership in the lien network 200, both members 203 and 206 are linked contractually to each other, as well as to the provisions, obligations and rules of membership of the lien network, including, but not limited to negotiated reimbursement rates, fees, actions and consequences, etc. set forth by the owning entity of the lien network 212.

Health provider members 203 may comprise, without being limited to, single or multiple physician practices, hospitals, outpatient clinics, medical testing centers, lab services, ambulatory services, radiological services and those entities, which provide medical equipment and pharmaceutical products as part of interaction and related health care to and for patients; additionally, any single or multiple non-medical health providers of health-related treatment and/or services.

Liability insurance company members 206 represent all types of insurance companies, who, through their insurance policies, are financially liable when their policyholders become tortfeasors in an injury claim; whereby, policyholders are inclusive of, but not solely limited to individuals, businesses, associations, public companies and organizations deemed responsible for actions causing injury to a separate party.

Members 203 and 206 may represent an individual and/or plurality of legally organized and recognized entities within the health care and liability insurance industries—be they sole proprietorship, corporation, partnership, limited liability company, membership, association or other legally-recognized consortium.

Members 203 and 206 may or may not be charged a membership fee for being in the lien network 200.

Specifically, lien network 200 comprises a computer data network 200A, with a relational database 201, ASP based website and related server(s) 202, connection to transmit information between database and website 201A, a lien data server 204 as well as related connections therein.

Computer data network 200A may include, but is not limited to, any one or more of, for instance, the Internet, an intranet, a PAN (Personal Area Network), a LAN (Local Area Network), a WAN (Wide Area Network), a SAN (Storage Area Network), or a MAN (Metropolitan Area Network).

Database 201 may be one or more databases, including, or interfacing to, for example, an Oracle™ relational database sold commercially by Oracle Corporation. Other databases, such as Informix™, DB2 (Database 2) or other data storage or query formats, platforms, or resources such as OLAP (On Line Analytical Processing), SQL (Standard Query Language), a SAN (storage area network), Microsoft Access™ or others may also be used, incorporated, or accessed into the invention.

Lien data server 204 receives, communicates with and stores lien data from health provider members 203. Moreover, server 204 may comprise one or more servers in number, including a workstation running Microsoft Windows™ NT™, Microsoft Windows™ 2000, Unix, Linux, Xenix, IBM, AIX™, Hewlett-Packard UX™, Novell Netware™, Sun Microsystems Solaris™, OS/2™, BeOS™, Mach, Apache, OpenStep,™ or other operating system or platform.

Health provider member 203 sends lien data in a secure fashion through FTP communication 203A or other similar secure means to the computer data network's lien data server 204, designated to receive and store information solely from health provider member.

Lien data may include, but not be solely limited to health provider member identity, contact and related identifying information; the health provider's patients, including identifying information for the patients such as, but not solely limited to patient's identity, related private health information, billable services, dates of injury-related treatment, existence of a health provider—patient lien or other legally binding agreements, amounts previously paid on treatment and related services, patient health insurance information—if applicable, HIPAA authorization, health related claim forms, a contingency-based health provider—patient lien, allowing for the collection of differential monies, identification of a registered patient's injury cause and attorney.

Lien data may also be known as "lien information", "patient claim information", "data" or "information" in relation to appropriate context.

In an alternative implementation, lien data from the health provider member 203 may be provided to computer data network 200A via transfer of media including, for example, Blu-Ray disk, DVD, CD-ROM, memory stick, tape, disk, and/or other suitable removable media, wireless means, as well as paper records.

Lien data server 204 receives lien information from health provider member 203 via 203A; subsequently, 203A allows for member 206 to evaluate information it has uploaded for determining completeness and accuracy of the lien data housed in server 204.

Moreover, lien data server 204 uploads the received information independently and through secure means per 205 to the computer data network's relational database 201.

The uploaded information from lien data server 204 to the relational database 201 is sent in whole or partial form, depending on the use of analytics, software and specific data per specificity by relational database 201 as determined by the needs of computer data network 200A.

Liability insurance company members 206, receive as a part of normal business, injury-related claims, whereby a policyholder of the liability insurance company may be responsible for the cause of injury to the injured party. The liability insurance company has a responsibility to protect its policyholder in such matters financially.

The injury claim submitted by the injured party 222 to the liability insurance company member 206 may contain bills from health-related care, treatment and services, given to the injured party/patient 222 by a health provider member 203.

Moreover, the bills related to these health services may be included within a financial instrument, such as a contingency-based health provider—patient lien, allowing for collection of owed differential monies to health provider member 203, made between the patient/injured party 222 and a health provider member 203, prior to the rendering of services. The lien, already submitted by the health provider member 203 through 203A, may be held by the lien network 200, whereby the provider may assign rights to collection of the lien to the owning entity of the lien network 212, when placing the lien in the lien network's domain.

In 207, liability insurance company member 206 may query database 201; the query is made through ASP site 202 via 202B. There may or may not be a charge for liability insurance company member 206 to pay the owning entity of the lien network 212 for the query.

The query allows the liability insurance company member 206 to determine a match of identity between the injured party 222 to any individual patient held within the database, related matched medical services and billings, and if those billings were included under a lien between the health provider member 203 and injured party/patient 222 at a time before such health services were rendered.

The computer data network 200A has an ASP based website and related server(s) 202, allowing members 203 and 206 to connect into the website through 202A and 202B respectfully, to a pre-arranged, evolving set of data and/or reports, as so allowed by the computer data network 200A, through the use of a GUI interface 201A or similar means, to pull only specific information kept at relational database 201. This may include, but is not limited to, need for additional information, changes in information, open and closed lien claims as well as current status of such.

Any payment for query 207 is not contingent upon receiving a match of information from database 201; furthermore, response information 208 received by the liability insurance company member 206 by the computer data network 200A may or may not show a match of identity.

However, when lien data held by the database 201 matches up with injury claims data held by the liability insurance company 206, the liability insurance company 206 may, as shown in 209, use the lien data with inclusive patient lien and medical billing information to better negotiate, reduce or eliminate payment for injury claims by leveraging existing owed differential monies under an existing lien against monies sought through a liability claim by injured party 222, whereby the injured party is also a patient 222 of the health provider member 203.

When the injured party 222 and liability insurance company member 206 have negotiated the claim to an agreed amount 210, the liability insurance company member 206, now deemed the lien effecter, honors the existing lien between health provider member 203 and patient 222; furthermore, alerting the injured party/patient in 222 that the lien amount portion of the claim 211 will be paid through dispersal to the health provider member 203 and other parties, with the remaining monies remitted to the injured party/patient 222.

In 210, there exists an agreement between the liability insurance company member 206 and the injured party 222, a judgment or award from a court, inclusive of setting aside appropriate lien monies, with the liability insurance company member 206 honoring and paying the lien amount 211 for eventual dispersal.

If the claim submitted from the injured party 222 is successfully dismissed by the liability insurance company member 206 or a court rules in favor of the liability insurance company member 206 with no stipulation of payment to the injured party/patient 222, the lien obligation and related monies may no longer be payable by the liability insurance company member 206 to the owning entity of the lien network 212 or any other related parties of the lien network 200.

In 214, the injured party/patient 222 is paid by the liability insurance company member 206 for the injury claim, excepting aforementioned and set aside lien monies 211, by the liability insurance company member 206.

In 211, which may occur before or after the liability insurance company member's payment 214 to the injured party/claimant 222, the liability insurance company member 206 makes a payment of lien monies to the owning entity of the lien network 212.

Subsequent to its receipt of monies, the owning entity 212 through 215, remits a pre-arranged portion of lien monies back to liability insurance company member 206 per liability insurance company member's compensation as lien effecter, for honoring the health provider—patient lien for health provider member 203.

In 216, the owning entity 212 takes a pre-arranged portion of lien monies as compensation for itself.

After compensation from the lien monies has been paid to both the liability insurance company member 206 and the owning entity 212, the owning entity pays the remaining portion of the lien monies in 217 to the health provider member 203.

In 218, the injured party/patient 222 requests verification from the lien network 200, that liability insurance company member 206 did in fact set aside lien monies per 211; moreover, that payment to the health provider member per 217, was made by the owning entity 212 and received by health provide member 203;

Additionally, the request of 218 covers both liability compensation monies in 215 as well as owning entity compensation monies in 216.

A verification report 219, from the lien network satisfies the provisions and request of 218. Furthermore, that the amounts in 215, 216 and 217 equals the amount of lien monies set aside in 211.

Figure 3:
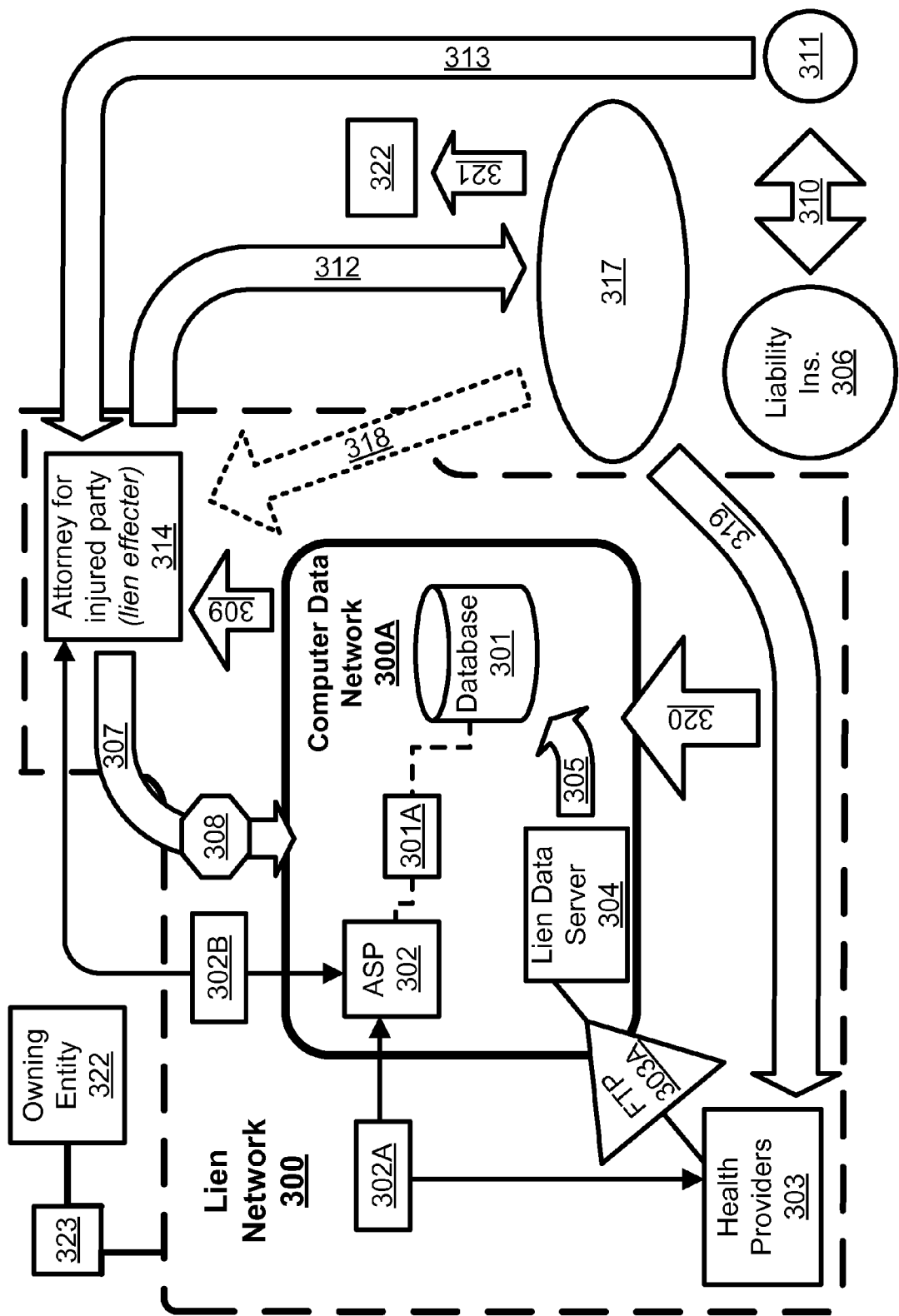
FIG. 3 is an illustration of a healthcare-related lien network via a business-to-business model with an attorney for an injured party as lien effecter, as per an aspect of an embodiment of the invention.

According to FIG. 3, a second embodiment of the system and method shows a business-to-business model reflecting an owning entity 322 of a member-based lien network 300, both linked through a legal, proprietary relationship 323. Members of the network 300 comprise health provider members 303 and attorneys who represent an injured party 314.

While both the health provider 303 and an attorney in 314 may be members, in this embodiment, the attorney representing an injured party 314 contracts as a temporary member to the lien network 300, through a limited agreement with the lien network in 308.

Through membership in the lien network 300, both members 303 and 314 may be linked contractually to each other, as well as to the provisions, obligations and rules of membership set forth by the owning entity of the lien network 322.

Health provider members 303 may comprise, without being limited to, single or multiple physician practices, hospitals, outpatient clinics, medical testing centers, lab services, ambulatory services and radiological services, all inclusive equipment, services and medications as a part of their interactions with patients; furthermore, any single or multiple non-medical health providers of health-related treatment and/or services.

An attorney in 314 may comprise, without being limited to, single or group attorney practices, a mediator or any non-attorney representative, so long as they represent the legal interests and defense of an injured party.

Typically, an injury claim may have parties including an attorney representing an injured party 314 and a liability insurance company 306, who represents a tortfeasor, or party accused of causing an injury.

Health provider members 303 and an attorney representing an injured party 314 may be individuals, multiple parties, or may constitute an association, corporation, membership or consortium.

Members 303 and 314 may or may not be charged a membership fee for being in the lien network 300.

Specifically, lien network 300 comprises a computer data network 300A, with a relational database 301, ASP based website and related server(s) 302, connection to transmit information between database and website 301A, a lien data server 304 as well as related connections therein.

Computer data network 300A may include, but is not limited to, any one or more of, for instance, the Internet, an intranet, a PAN (Personal Area Network), a LAN (Local Area Network), a WAN (Wide Area Network), a SAN (Storage Area Network), or a MAN (Metropolitan Area Network).

Database 301 may be one or more databases, including, or interfacing to, for example, an Oracle™ relational database sold commercially by Oracle Corporation. Other databases, such as Informix™, DB2 (Database 2) or other data storage or query formats, platforms, or resources such as OLAP (On Line Analytical Processing), SQL (Standard Query Language), a SAN (storage area network), Microsoft Access™ or others may also be used, incorporated, or accessed into the invention.

Lien data server 304 receives, communicates with and stores data from health provider members 303. Moreover, lien data server 304 may comprise one or more servers in number, including a workstation running Microsoft Windows™ NT™, Microsoft Windows™ 2000, Unix, Linux, Xenix, IBM, AIX™, Hewlett-Packard UX™, Novell Netware™, Sun Microsystems Solaris™, OS/2™, BeOS™, Mach, Apache, OpenStep,™ or other operating system or platform.

Health provider members 303 send their lien data electronically in a secure fashion through FTP communication 303A or other similar secure means to the computer data network's lien data server 304, designated to receive and store information only from health provider members 303.

Lien data may include, but not be solely limited to health provider member name, the health provider member's patients, billable patient services, dates of injury-related treatment, existence of a health provider—patient lien, amounts previously paid on treatment and related services, patient health insurance information—if applicable, HIPAA authorization, health related claim forms, identification of a registered patient's injury cause and a contingency-based health provider—patient lien, allowing for the collection of differential monies, identification of a registered patient's injury cause and attorney.

Lien data may also be known as "lien information", "patient claim information", "data" or "information" in relation to appropriate context.

In an alternative implementation, lien data from the health provider member 303 may also be provided to computer data network 300A via transfer of media including, for example, Blu-Ray disk, DVD, CD-ROM, memory stick, tape, disk, and/or other suitable removable media, wireless means, as well as paper records.

Lien data server 304 receives lien information from health provider members 303; subsequently, lien data server 304 has the ability to communicate missing or needed information back to health provider members 303, when necessary. Moreover, lien data server 304 uploads the received information through secure means to the computer data network's relational database 301 through 305.

The uploaded information from lien data server 304 to the relational database 301 is sent in whole or partial form, depending on the use of analytics, software and specific data per specificity by relational database 301 as determined by the needs of computer data network 300A.

As a normal part of managing an injury case, the attorney who represents an injured party 314 submits injury claims to a liability insurance company 306, which represents a tortfeasor or entity deemed to have been responsible for the injury.

The injury claim submitted by the attorney representing an injured party 314 may contain bills from health-related care, treatment and services, given to the attorney 314 by a health provider member 303 or their patient, who also is the injured party represented by attorney 314.

Moreover, the bills related to these health services may be included within a financial instrument, such as a contingency-based health provider—patient lien, allowing for collection of owed differential monies to health provider member 303, made between the patient/injured party and a health provider member 303, prior to the rendering of services. The lien, already submitted by the health provider member 303 through 303A, may be held by the lien network 300, whereby the provider may assign rights to collection of the lien to the owning entity of the lien network 322, when placing the lien in the lien network's domain.

In 307, an attorney representing an injured party 314 may query database 301; the query is made through ASP site 302 via 302B. There may or may not be a charge for the attorney 314 to pay the owning entity of the lien network 322 for the query.

The query allows the attorney representing an injured party 314 to determine a match of identity between the injured party to any individual patient held within the database, related matched medical services and billings, and if those billings were included under a lien between the health provider member 303 and the patient represented by attorney 314 at a time before such health services were rendered.

The computer data network 300A has an ASP based website and related server(s) 302, allowing members 303 and 314 to connect into the website through 302A and 302B respectfully, to a pre-arranged, evolving set of data and/or reports, as so allowed by the computer data network 300A, through the use of a GUI interface 301A or similar means, to pull only specific information kept at relational database 301. This may include, but is not limited to, need for additional information, changes in information, open and closed lien claims as well as current status of such.

However, before any data from the query of the attorney 314 in 307 is released per 309 from the computer data network 300A to an attorney representing an injured party 314 or any payment is accepted by lien network 300 from an attorney representing an injured party 314, the attorney must sign a one-time, per case agreement 308 between itself and the lien network 300.

Agreement 308 legally binds the attorney representing an injured party 314, to honor both the existing health provider—patient lien held within the lien network 300, and all the provisions of being a member, albeit temporary, in the lien network 300. This in turn makes the attorney 314 the lien effecter of this business model.

Subsequent to the execution of agreement 308, the computer network 300A of the lien network 300 is able to accept query 307 from an attorney representing an injured party 314 for lien data and related information.

If there is payment in 307, made from the attorney representing an injured party 314 to the owning entity of the lien network 322, it is for querying the computer data network 300A, and is not contingent upon receiving a match of information.

In 309, the attorney for the injured party 314 receives a response as to whether or not there is a match between his injured party and the patient of the health provider member 303, held within the computer data network 300A.

If a match exists, the attorney 314 agrees, as the lien effecter, to honor and set aside any lien-related monies collected on behalf of the injured party.

When the liability insurance company 306 and an attorney representing an injured party 314 have negotiated the claim per 310 to an agreed amount 311, the claim may include and be calculated from the use of billings from the health provider member 303.

The attorney representing an injured party 314, now deemed the lien effecter, honors the existing lien between health provider member 303 and the patient, per collection rights of the lien having been assigned and held by the owning entity of the lien network 322.

In 312, the attorney representing an injured party 314 sets aside the lien monies related to the lien for disbursement per 317.

If the injury claim submitted from the attorney representing an injured party 314 is successfully dismissed by the liability insurance company 306 or a court rules in favor of the liability insurance company 306 with no stipulation of payment to the injured party represented by attorney 314, the lien obligation and related monies may no longer be payable by the attorney representing an injured party 314 to the health provider member 303 or any other related parties of the lien network 300.

In 313, the attorney representing the injured party is paid by the liability insurance company 306 for the injury claim, excepting aforementioned and set aside lien monies 312, by the attorney representing an injured party 314.

In 317, the attorney representing an injured party 314 as lien effecter, arranges and thereby disperses the lien monies, that is, owed differential monies related to the recognized health provider—patient lien, specifically for redistribution within provisions of the lien network 300.

Prior to remittance of money to health provider member 303, the attorney representing an injured party 314, as lien effecter, through a negotiated arrangement per membership in and subscription to, the lien network 300, may take an optional, portion of lien monies 318 as part of compensation.

In 321, a dispersal of lien monies may be given to the owning entity 322 of lien network 300.

In 319, an attorney representing an injured party 314 disperses a payment to health provider member 303, which constitutes a portion of lien monies from 312.

Per 320, the computer data network 300A of the lien network 300 is made aware of both submission of payment by an attorney representing an injured party 314 in 319, as well as receipt of payment by health provider member 303, through each member's responsibility to the lien network 300.

Additionally in 320, the attorney representing an injured party 314 verifies to the computer data network 300A of the lien network 300, that optional compensation payment 318 and payment to owning entity in 321 is in keeping with agreed upon rates within the provisions of the lien network 300.

Furthermore, the amounts in 318, 319 and 321 equal the amount of lien monies set aside in 312, as so agreed to between an attorney representing an injured party 314 and the provision of the lien network 300.

Figure 4:
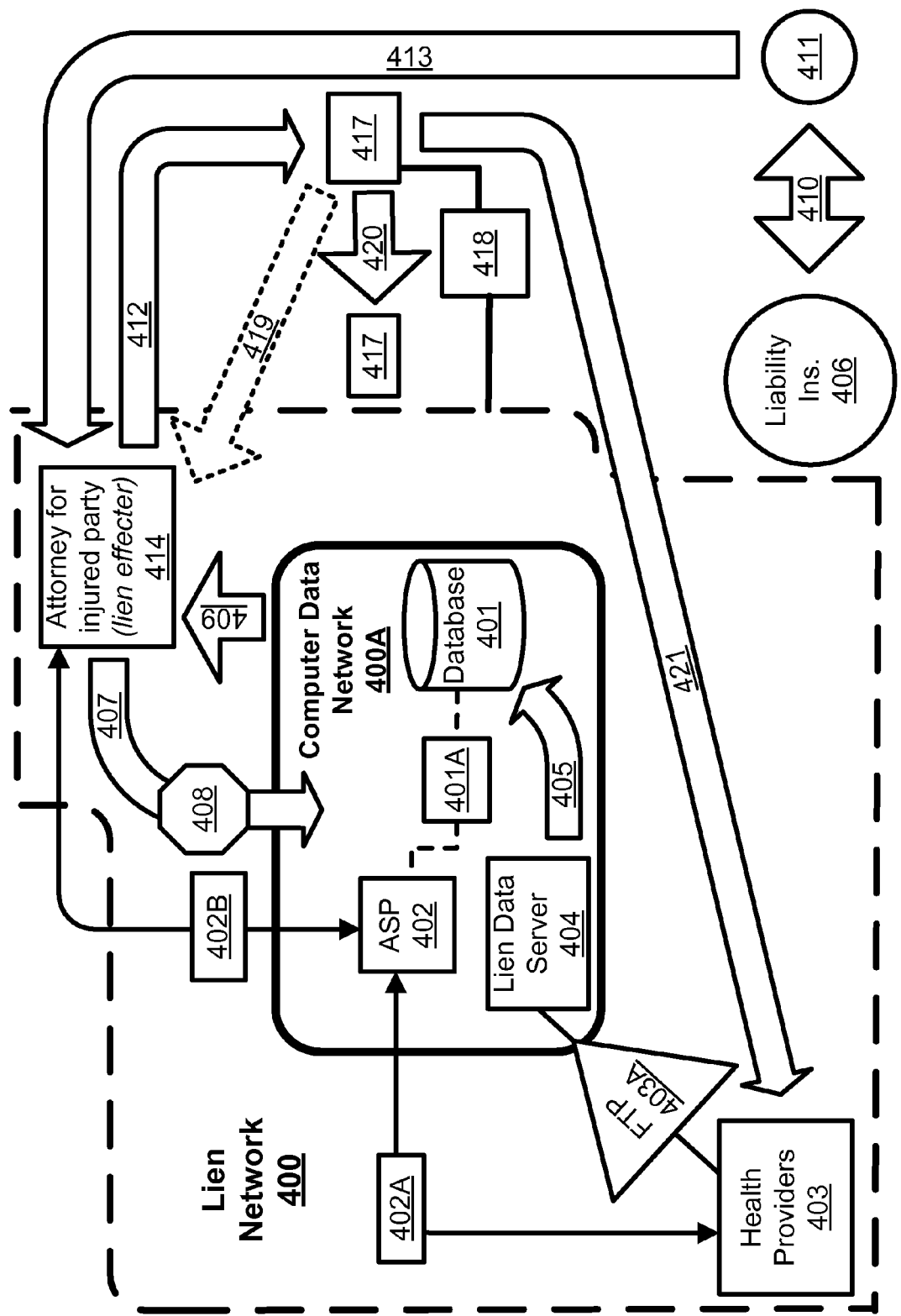
FIG. 4 is another illustration of a healthcare-related lien network via a business-to-business model with an attorney for an injured party as lien effecter, as per an aspect of an embodiment of the invention.

According to FIG. 4, a variation of the second embodiment of the system and method shows a business-to-business model reflecting an owning entity 417 of a member-based lien network 400, both linked through a legal, proprietary relationship 418. Members of the network 400 comprise health provider members 403 and attorneys who represent injured parties 414.

While both the health provider 403 and an attorney in 414 may be members, in this embodiment, the attorney representing an injured party 414 contracts as a temporary member to the lien network 400, through a limited agreement with the lien network in 408.

Through membership in the lien network 400, both members 403 and 414 may be linked contractually to each other, as well as to the provisions, obligations and rules of membership set forth by the owning entity of the lien network 417.

Health provider members 403 may comprise, without being limited to, single or multiple physician practices, hospitals, outpatient clinics, medical testing centers, lab services, ambulatory services and radiological services, all inclusive equipment, services and medications as a part of their interactions with patients; furthermore, any single or multiple non-medical health providers of health-related treatment and/or services.

An attorney in 414 may comprise, without being limited to, single or group attorney practices, a mediator or any non-attorney representative, so long as they represent the legal interests and defense of an injured party.

Typically, an injury claim may have parties including an attorney representing an injured party 414 and a liability insurance company 406, who represents a tortfeasor, or party accused of causing an injury.

Health provider members 403 and an attorney representing an injured party 414 may be individuals, multiple parties, or may constitute an association, corporation, membership or consortium.

Members 403 and 414 may or may not be charged a membership fee for being in the lien network 400.

Specifically, lien network 400 comprises a computer data network 400A, with a relational database 401, ASP based website and related server(s) 402, connection to transmit information between database and website 401A, a lien data server 404 as well as related connections therein.

Computer data network 400A may include, but is not limited to, any one or more of, for instance, the Internet, an intranet, a PAN (Personal Area Network), a LAN (Local Area Network), a WAN (Wide Area Network), a SAN (Storage Area Network), or a MAN (Metropolitan Area Network).

Database 401 may be one or more databases, including, or interfacing to, for example, an Oracle™ relational database sold commercially by Oracle Corporation. Other databases, such as Informix™, DB2 (Database 2) or other data storage or query formats, platforms, or resources such as OLAP (On Line Analytical Processing), SQL (Standard Query Language), a SAN (storage area network), Microsoft Access™ or others may also be used, incorporated, or accessed into the invention.

Lien data server 404 receives, communicates with and stores data from health provider members 403. Moreover, lien data server 404 may comprise one or more servers in number, including a workstation running Microsoft Windows™ NT™, Microsoft Windows™ 2000, Unix, Linux, Xenix, IBM, AIX™, Hewlett-Packard UX™, Novell Netware™, Sun Microsystems Solaris™, OS/2™, BeOS™, Mach, Apache, OpenStep,™ or other operating system or platform.

Health provider members 403 send their lien data electronically in a secure fashion through FTP communication 403A or other similar secure means to the computer data network's lien data server 404, designated to receive and store information only from health provider members 403.

Lien data may include, but not be solely limited to health provider member name, the health provider member's patients, billable patient services, dates of injury-related treatment, existence of a health provider—patient lien, amounts previously paid on treatment and related services, patient health insurance information—if applicable, HIPAA authorization, health related claim forms, identification of a registered patient's injury cause and a contingency-based health provider—patient lien, allowing for the collection of differential monies, identification of a registered patient's injury cause and attorney.

Lien data may also be known as "lien information", "patient claim information", "data" or "information" in relation to appropriate context.

In an alternative implementation, lien data from the health provider member 403 may also be provided to computer data network 400A via transfer of media including, for example, Blu-Ray disk, DVD, CD-ROM, memory stick, tape, disk, and/or other suitable removable media, wireless means, as well as paper records.

Lien data server 404 receives lien information from health provider members 403; subsequently, lien data server 404 has the ability to communicate missing or needed information back to health provider members 403, when necessary. Moreover, lien data server 404 uploads the received information through secure means to the computer data network's relational database 401 through 405.

The uploaded information from lien data server 404 to the relational database 401 is sent in whole or partial form, depending on the use of analytics, software and specific data per specificity by relational database 401 as determined by the needs of computer data network 400A.

As a normal part of managing an injury case, the attorney who represents an injured party 414 submits injury claims to a liability insurance company 406, which represents a tortfeasor or entity deemed to have been responsible for the injury.

The injury claim submitted by the attorney representing an injured party 414 may contain bills from health-related care, treatment and services, given to the attorney 414 by a health provider member 403 or their patient, who also is the injured party represented by attorney 414.

Moreover, the bills related to these health services may be included within a financial instrument, such as a contingency-based health provider—patient lien, allowing for collection of owed differential monies to health provider member 403, made between the patient/injured party and a health provider member 403, prior to the rendering of services. The lien, already submitted by the health provider member 403 through 403A, may be held by the lien network 400, whereby the provider may assign rights to collection of the lien to the owning entity of the lien network 417, when placing the lien in the lien network's domain.

In 407, an attorney representing an injured party 414 may query database 401; the query is made through ASP site 402 via 402B. There may or may not be a charge for the attorney 414 to pay the owning entity of the lien network 417 for the query.

The query allows the attorney representing an injured party 414 to determine a match of identity between the injured party to any individual patient held within the database, related matched medical services and billings, and if those billings were included under a lien between the health provider member 403 and the patient represented by attorney 414 at a time before such health services were rendered.

The computer data network 400A has an ASP based website and related server(s) 402, allowing members 403 and 414 to connect into the website through 402A and 402B respectfully, to a pre-arranged, evolving set of data and/or reports, as so allowed by the computer data network 400A, through the use of a GUI interface 401A or similar means, to pull only specific information kept at relational database 401. This may include, but is not limited to, need for additional information, changes in information, open and closed lien claims as well as current status of such.

However, before any data from the query of the attorney 414 in 407 is released per 409 from the computer data network 400A to an attorney representing an injured party 414 or any payment is accepted by lien network 400 from an attorney representing an injured party 414, the attorney must sign a one-time, per case agreement 408 between itself and the lien network 400.

Agreement 408 legally binds the attorney representing an injured party 414, to honor both the existing health provider—patient lien held within the lien network 400, and all the provisions of being a member, albeit temporary, in the lien network 400. This in turn makes the attorney 414 the lien effecter of this business model.

Subsequent to the execution of agreement 408, the computer network 400A of the lien network 400 is able to accept query 407 from an attorney representing an injured party 414 for lien data and related information.

If there is payment in 407, made from the attorney representing an injured party 414 to the owning entity of the lien network 417, it is for querying the computer data network 400A, and is not contingent upon receiving a match of information.

In 409, the attorney for the injured party 414 receives a response as to whether or not there is a match between his injured party and the patient of the health provider member 403, held within the computer data network 400A.

If a match exists, the attorney 414 agrees, as the lien effecter, to honor and set aside any lien-related monies collected on behalf of the injured party.

When the liability insurance company 406 and an attorney representing an injured party 414 have negotiated the claim per 410 to an agreed amount 411, the claim may include and be calculated from the use of billings from the health provider member 403.

The attorney representing an injured party 414, now deemed the lien effecter, honors the existing lien between health provider member 403 and the patient, per collection rights of the lien having been assigned and held by the owning entity of the lien network 417.

In 412, the attorney representing an injured party 414 sets aside the lien monies related to the lien. The lien monies set aside are paid from the attorney 414 to the owning entity of the lien network 417.

If the injury claim submitted by the attorney representing an injured party 414 is successfully dismissed by the liability insurance company 406 or a court rules in favor of the liability insurance company 406 with no stipulation of payment to the injured party represented by attorney 414, the lien obligation and related monies may no longer be payable by the attorney representing an injured party 414 to the owning entity of the lien network 417 or any other related parties of the lien network 400.

In 413, the attorney representing the injured party is paid by the liability insurance company 406 for the injury claim, excepting aforementioned and set aside lien monies 412, by the attorney representing an injured party 414.

Having received the lien monies, the owning entity of the lien network 417 arranges and thereby disperses the lien monies, that is, owed differential monies related to the recognized health provider—patient lien, specifically for redistribution within provisions of the lien network 400.

Prior to remittance of money to health provider member 403, the owning entity of the lien network 417, may make a payment 420 to itself as compensation per a negotiated arrangement per lien network 400.

In 419, there may be optional payment made from the owning entity of the lien network 417 to the attorney for the injured party 414, as a provision of the lien network 400.

In 421, the owning entity of the lien network 417 disperses a payment to health provider member 403, which constitutes a portion of lien monies from 412.

Furthermore, the amounts in 419, 420 and 421 equal the amount of lien monies set aside in 412, as so agreed between an attorney representing an injured party 414 and the provision of the lien network 400.

Figure 5:
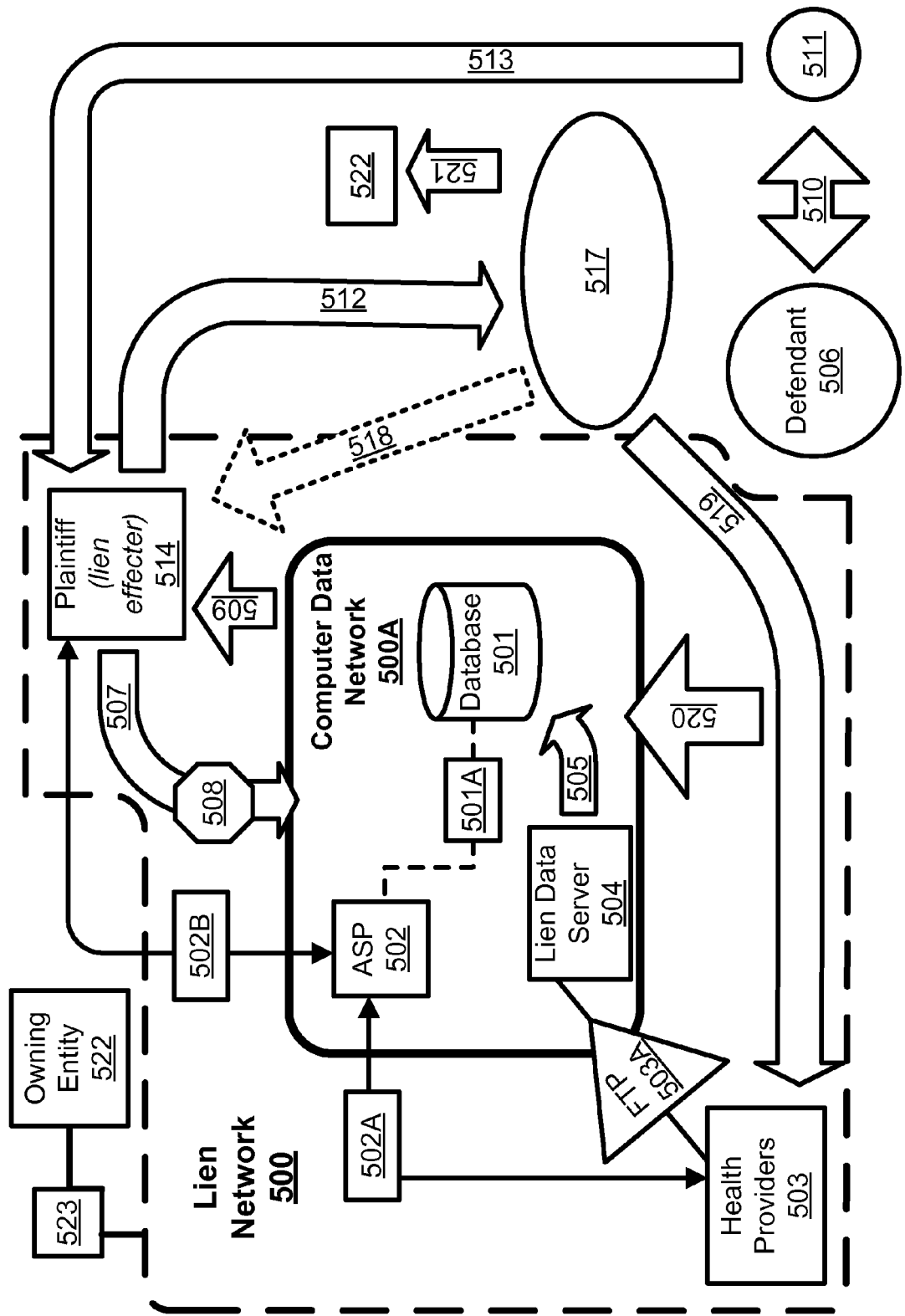
FIG. 5 is an illustration of a healthcare-related lien network via a business-to-business model with a plaintiff in a tort case as lien effecter, as per an aspect of an embodiment of the invention.

According to FIG. 5, a third embodiment of the system and method shows a business-to-business model reflecting an owning entity 522 of a member-based lien network 500, both linked through a legal, proprietary relationship 523. Members of the network 500 comprise health provider members 503 and a plaintiff in a tort case 514.

While both the health provider 503 and a plaintiff in 514 may be members, in this embodiment, the plaintiff 514 contracts as a temporary member to the lien network 500, through a limited agreement with the lien network in 508.

Through membership in the lien network 500, both members 503 and 514 may be linked contractually to each other, as well as to the provisions, obligations and rules of membership set forth by the owning entity of the lien network 522.

Health provider members 503 may comprise, without being limited to, single or multiple physician practices, hospitals, outpatient clinics, medical testing centers, lab services, ambulatory services and radiological services, all inclusive equipment, services and medications as a part of their interactions with patients; furthermore, any single or multiple non-medical health providers of health-related treatment and/or services.

A plaintiff in 514 may comprise, without being limited to an individual, group of individuals, a company, corporation, association or any business entity or group thereof, any of which considering themselves an injured party in a tort case.

Typically, an injury claim may have parties including a plaintiff 514 and a defendant 506; the defendant either being or representing a tortfeasor, or party accused of causing an injury.

Health provider members 503 may be individuals, multiple parties, or may constitute an association, corporation, membership or consortium.

Members 503 and 514 may or may not be charged a membership fee for being in the lien network 500.

Specifically, lien network 500 comprises a computer data network 500A, with a relational database 501, ASP based website and related server(s) 502, connection to transmit information between database and website 501A, a lien data server 504 as well as related connections therein.

Computer data network 500A may include, but is not limited to, any one or more of, for instance, the Internet, an intranet, a PAN (Personal Area Network), a LAN (Local Area Network), a WAN (Wide Area Network), a SAN (Storage Area Network), or a MAN (Metropolitan Area Network).

Database 501 may be one or more databases, including, or interfacing to, for example, an Oracle™ relational database sold commercially by Oracle Corporation. Other databases, such as Informix™, DB2 (Database 2) or other data storage or query formats, platforms, or resources such as OLAP (On Line Analytical Processing), SQL (Standard Query Language), a SAN (storage area network), Microsoft Access™ or others may also be used, incorporated, or accessed into the invention.

Lien data server 504 receives, communicates with and stores data from health provider members 503. Moreover, lien data server 504 may comprise one or more servers in number, including a workstation running Microsoft Windows™ NT™, Microsoft Windows™ 2000, Unix, Linux, Xenix, IBM, AIX™, Hewlett-Packard UX™, Novell Netware™, Sun Microsystems Solaris™, OS/2™, BeOS™, Mach, Apache, OpenStep,™ or other operating system or platform.

Health provider members 503 send their lien data electronically in a secure fashion through FTP communication 503A or other similar secure means to the computer data network's lien data server 504, designated to receive and store information only from health provider members 503.

Lien data may include, but not be solely limited to health provider member name, the health provider member's patients, billable patient services, dates of injury-related treatment, existence of a health provider—patient lien, amounts previously paid on treatment and related services, patient health insurance information—if applicable, HIPAA authorization, health related claim forms, identification of a registered patient's injury cause and a contingency-based health provider—patient lien, allowing for the collection of differential monies, identification of a registered patient's injury cause and attorney.

Lien data may also be known as "lien information", "patient claim information", "data" or "information" in relation to appropriate context.

In an alternative implementation, lien data from the health provider member 503 may also be provided to computer data network 500A via transfer of media including, for example, Blu-Ray disk, DVD, CD-ROM, memory stick, tape, disk, and/or other suitable removable media, wireless means, as well as paper records.

Lien data server 504 receives lien information from health provider members 503; subsequently, lien data server 504 has the ability to communicate missing or needed information back to health provider members 503, when necessary. Moreover, lien data server 504 uploads the received information through secure means to the computer data network's relational database 501 through 505.

The uploaded information from lien data server 504 to the relational database 501 is sent in whole or partial form, depending on the use of analytics, software and specific data per specificity by relational database 501 as determined by the needs of computer data network 500A.

As a normal part of a tort case, the plaintiff 514 submits injury claims to a defendant 506, which represents a tortfeasor or entity deemed to have been responsible for the injury.

The injury claim submitted by the plaintiff 514 may contain bills from health-related care, treatment and services, given to the plaintiff 514 by a health provider member 503 or their patient; the patient may either represent the plaintiff or be the plaintiff 514.

Moreover, the bills related to these health services may be included within a financial instrument, such as a contingency-based health provider—patient lien, allowing for collection of owed differential monies to health provider member 503, made between the patient and a health provider member 503, prior to the rendering of services. The lien, already submitted by the health provider member 503 through 503A, may be held by the lien network 500, whereby the provider may assign rights to collection of the lien to the owning entity of the lien network 522, when placing the lien in the lien network's domain.

In 507, a plaintiff 514 may query database 501; the query is made through ASP site 502 via 502B. There may or may not be a charge for the plaintiff 514 to pay the owning entity of the lien network 522 for the query.

The query allows the plaintiff 514 to determine a match of identity between the injured party to any individual patient held within the database, related matched medical services and billings, and if those billings were included under a lien between the health provider member 503 and the patient at a time before such health services were rendered.

The computer data network 500A has an ASP based website and related server(s) 502, allowing members 503 and 514 to connect into the website through 502A and 502B respectfully, to a pre-arranged, evolving set of data and/or reports, as so allowed by the computer data network 500A, through the use of a GUI interface 501A or similar means, to pull only specific information kept at relational database 501. This may include, but is not limited to, need for additional information, changes in information, open and closed lien claims as well as current status of such.

However, before any data from the query of the plaintiff 514 in 507 is released per 509 from the computer data network 500A to plaintiff 514 or any payment is accepted by lien network 500 from plaintiff 514, the plaintiff must sign a one-time, per case agreement 508 between itself and the lien network 500.

Agreement 508 legally binds the plaintiff 514, to honor both the existing health provider—patient lien held within the lien network 500, and all the provisions of being a member, albeit temporary, in the lien network 500. This in turn makes the plaintiff 514 the lien effecter of this business model.

Subsequent to the execution of agreement 508, the computer network 500A of the lien network 500 is able to accept query 507 from plaintiff 514 for lien data and related information.

If there is payment in 507, made from the plaintiff 514 to the owning entity of the lien network 522, it is for querying the computer data network 500A, and is not contingent upon receiving a match of information.

In 509, the plaintiff 514 receives a response as to whether or not there is a match between the injured party and the patient of the health provider member 503, held within the computer data network 500A.

If a match exists, the plaintiff 514 agrees, as the lien effecter, to honor and set aside any lien-related monies collected on behalf of the injured party, even if the plaintiff is the injured party.

When the defendant 506 and plaintiff 514 have negotiated the claim per 510 to an agreed amount 511, the claim may include and be calculated from the use of billings from the health provider member 503.

The plaintiff 514, now deemed the lien effecter, honors the existing lien between health provider member 503 and the patient, per collection rights of the lien having been assigned and held by the owning entity of the lien network 522.

In 512, the plaintiff 514 sets aside the lien monies related to the lien for disbursement per 517.

If the injury claim submitted by plaintiff 514 is successfully dismissed by the defendant 506, or a court rules in favor of the defendant 506 with no stipulation of payment to the plaintiff 514, the lien obligation and related monies may no longer be payable by plaintiff 514 to the health provider member 503 or any other related parties of the lien network 500.

In 513, the plaintiff is paid by the defendant 506 for the injury claim, excepting aforementioned and set aside lien monies 512, by plaintiff 514.

In 517, the plaintiff 514 as lien effecter, arranges and thereby disperses the lien monies, that is, owed differential monies related to the recognized health provider—patient lien, specifically for redistribution within provisions of the lien network 500.

Prior to remittance of money to health provider member 503, the plaintiff 514, as lien effecter, through a negotiated arrangement per membership in and subscription to, the lien network 500, may take an optional, portion of lien monies 518 as part of compensation.

In 521, a dispersal of lien monies may be given to the owning entity 522 of lien network 500.

In 519, the plaintiff 514 disperses a payment to health provider member 503, which constitutes a portion of lien monies from 512.

Per 520, the computer data network 500A of the lien network 500 is made aware of both submission of payment by plaintiff 514 in 519, as well as receipt of payment by health provider member 503, through each member's responsibility to the lien network 500.

Additionally in 520, the plaintiff 514 verifies to the computer data network 500A of the lien network 500, that optional compensation payment 518 and payment to owning entity in 521 is in keeping with agreed upon rates within the provisions of the lien network 500.

Furthermore, the amounts in 518, 519 and 521 equal the amount of lien monies set aside in 512, as so agreed to between plaintiff 514 and the provision of the lien network 500.

Figure 6:
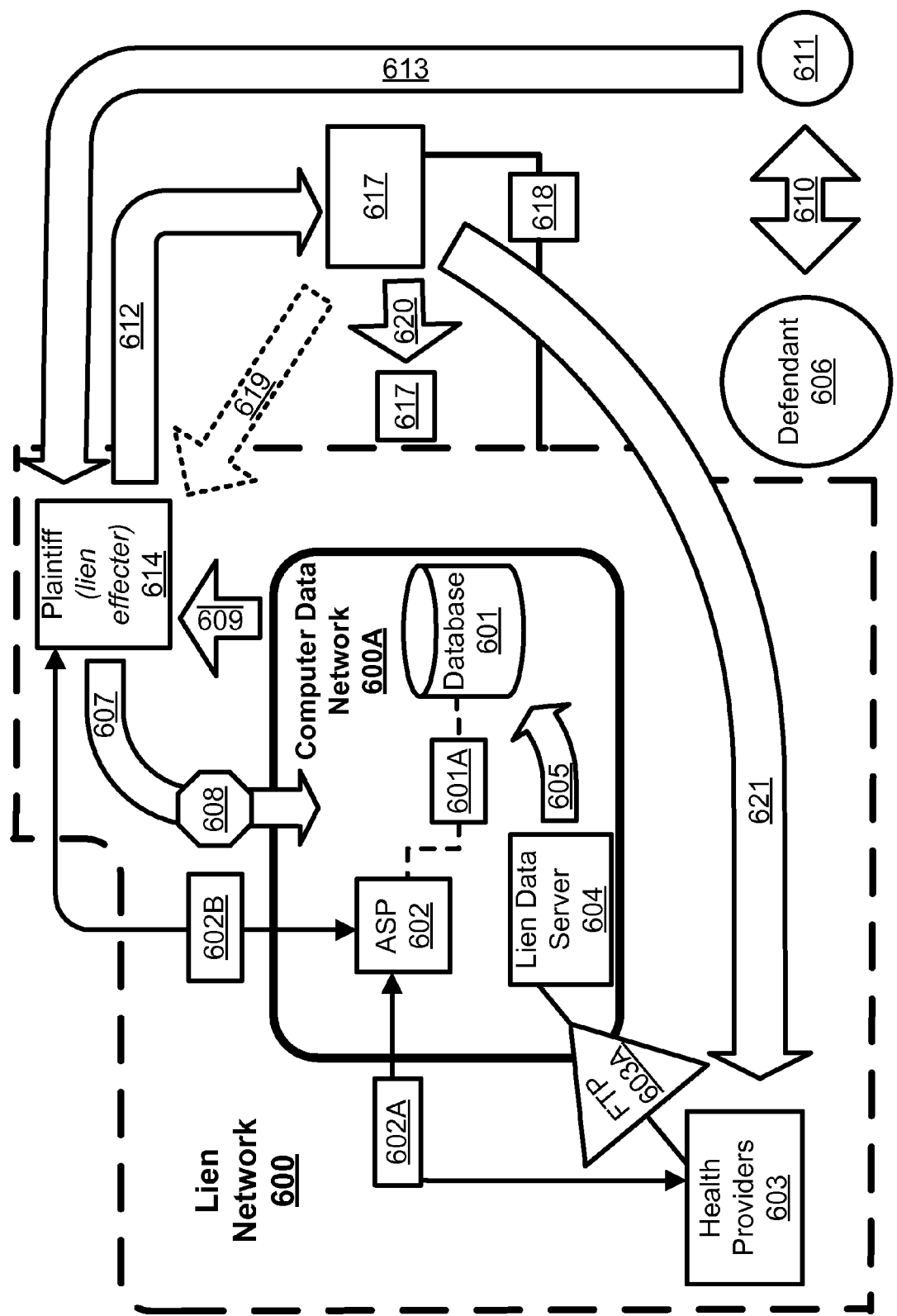
FIG. 6 is another illustration of a healthcare-related lien network via a business-to-business model with a plaintiff in a tort case as lien effecter, as per an aspect of an embodiment of the invention.

According to FIG. 6, a variation of the third embodiment of the system and method shows a business-to-business model reflecting an owning entity 617 of a member-based lien network 600, both linked through a legal, proprietary relationship 618. Members of the network 600 comprise health provider members 603 and a plaintiff in a tort case 614.

While both the health provider 603 and plaintiff 614 may be members, in this embodiment, the plaintiff 614 contracts as a temporary member to the lien network 600, through a limited agreement with the lien network in 608.

Through membership in the lien network 600, both members 603 and 614 may be linked contractually to each other, as well as to the provisions, obligations and rules of membership set forth by the owning entity of the lien network 617.

Health provider members 603 may comprise, without being limited to, single or multiple physician practices, hospitals, outpatient clinics, medical testing centers, lab services, ambulatory services and radiological services, all inclusive equipment, services and medications as a part of their interactions with patients; furthermore, any single or multiple non-medical health providers of health-related treatment and/or services.

A plaintiff in 614 may comprise, without being limited to an individual, group of individuals, a company, corporation, association or any business entity or group thereof, any of which considering themselves an injured party in a tort case.

Typically, an injury claim may have parties including a plaintiff 614 and a defendant 606; the defendant either being or representing a tortfeasor, or party accused of causing an injury.

Health provider members 603 may be individuals, multiple parties, or may constitute an association, corporation, membership or consortium.

Members 603 and 614 may or may not be charged a membership fee for being in the lien network 600.

Specifically, lien network 600 comprises a computer data network 600A, with a relational database 601, ASP based website and related server(s) 602, connection to transmit information between database and website 601A, a lien data server 604 as well as related connections therein.

Computer data network 600A may include, but is not limited to, any one or more of, for instance, the Internet, an intranet, a PAN (Personal Area Network), a LAN (Local Area Network), a WAN (Wide Area Network), a SAN (Storage Area Network), or a MAN (Metropolitan Area Network).

Database 601 may be one or more databases, including, or interfacing to, for example, an Oracle™ relational database sold commercially by Oracle Corporation. Other databases, such as Informix™, DB2 (Database 2) or other data storage or query formats, platforms, or resources such as OLAP (On Line Analytical Processing), SQL (Standard Query Language), a SAN (storage area network), Microsoft Access™ or others may also be used, incorporated, or accessed into the invention.

Lien data server 604 receives, communicates with and stores data from health provider members 603. Moreover, lien data server 604 may comprise one or more servers in number, including a workstation running Microsoft Windows™ NT™, Microsoft Windows™ 2000, Unix, Linux, Xenix, IBM, AIX™, Hewlett-Packard UX™, Novell Netware™, Sun Microsystems Solaris™, OS/2™, BeOS™, Mach, Apache, OpenStep,™ or other operating system or platform.

Health provider members 603 send their lien data electronically in a secure fashion through FTP communication 603A or other similar secure means to the computer data network's lien data server 604, designated to receive and store information only from health provider members 603.

Lien data may include, but not be solely limited to health provider member name, the health provider member's patients, billable patient services, dates of injury-related treatment, existence of a health provider—patient lien, amounts previously paid on treatment and related services, patient health insurance information—if applicable, HIPAA authorization, health related claim forms, identification of a registered patient's injury cause and a contingency-based health provider—patient lien, allowing for the collection of differential monies, identification of a registered patient's injury cause and attorney.

Lien data may also be known as "lien information", "patient claim information", "data" or "information" in relation to appropriate context.

In an alternative implementation, lien data from the health provider member 603 may also be provided to computer data network 600A via transfer of media including, for example, Blu-Ray disk, DVD, CD-ROM, memory stick, tape, disk, and/or other suitable removable media, wireless means, as well as paper records.

Lien data server 604 receives lien information from health provider members 603; subsequently, lien data server 604 has the ability to communicate missing or needed information back to health provider members 603, when necessary. Moreover, lien data server 604 uploads the received information through secure means to the computer data network's relational database 601 through 605.

The uploaded information from lien data server 604 to the relational database 601 is sent in whole or partial form, depending on the use of analytics, software and specific data per specificity by relational database 601 as determined by the needs of computer data network 600A.

As a normal part of managing an injury case, the plaintiff 614 submits injury claims to a defendant 606, which represents a tortfeasor or entity deemed to have been responsible for the injury.

The injury claim submitted by the plaintiff 614 may contain bills from health-related care, treatment and services, given to the plaintiff 614 by a health provider member 603 or their patient; the patient may either represent the plaintiff or be the plaintiff 614.

Moreover, the bills related to these health services may be included within a financial instrument, such as a contingency-based health provider—patient lien, allowing for collection of owed differential monies to health provider member 603, made between the patient and a health provider member 603, prior to the rendering of services. The lien, already submitted by the health provider member 603 through 603A, may be held by the lien network 600, whereby the provider may assign collection rights of the lien to the owning entity of the lien network 617, when placing the lien in the lien network's domain.

In 607, a plaintiff 614 may query database 601; the query is made through ASP site 602 via 602B. There may or may not be a charge for the plaintiff 614 to pay the owning entity of the lien network 617 for the query.

The query allows plaintiff 614 to determine a match of identity between the injured party to any individual patient held within the database, related matched medical services and billings, and if those billings were included under a lien between the health provider member 603 and the patient at a time before such health services were rendered.

The computer data network 600A has an ASP based website and related server(s) 602, allowing members 603 and 614 to connect into the website through 602A and 602B respectfully, to a pre-arranged, evolving set of data and/or reports, as so allowed by the computer data network 600A, through the use of a GUI interface 601A or similar means, to pull only specific information kept at relational database 601. This may include, but is not limited to, need for additional information, changes in information, open and closed lien claims as well as current status of such.

However, before any data from the query of the plaintiff 614 in 607 is released per 609 from the computer data network 600A to plaintiff 614 or any payment is accepted by lien network 600 from plaintiff 614, the plaintiff must sign a one-time, per case agreement 608 between itself and the lien network 600.

Agreement 608 legally binds the plaintiff 614, to honor both the existing health provider—patient lien held within the lien network 600, and all the provisions of being a member, albeit temporary, in the lien network 600. This in turn makes the plaintiff 614 the lien effecter of this business model.

Subsequent to the execution of agreement 608, the computer network 600A of the lien network 600 is able to accept query 607 from plaintiff 614 for lien data and related information.

If there is payment in 607, made from the plaintiff 614 to the owning entity of the lien network 617, it is for querying the computer data network 600A, and is not contingent upon receiving a match of information.

In 609, the plaintiff 614 receives a response as to whether or not there is a match between the injured party and the patient of the health provider member 603, held within the computer data network 600A.

If a match exists, the plaintiff 614 agrees, as the lien effecter, to honor and set aside any lien-related monies collected on behalf of the injured party.

When the defendant 606 and plaintiff 614 have negotiated the claim per 610 to an agreed amount 611, the claim may include and be calculated from the use of billings from the health provider member 603.

The plaintiff 614, now deemed the lien effecter, honors the existing lien between health provider member 603 and the patient, per collection rights of the lien having been assigned and held by the owning entity of the lien network 617.

In 612, the plaintiff 614 sets aside the lien monies related to the lien. The lien monies set aside are paid from the plaintiff 614 to the owning entity of the lien network 617.

If the injury claim submitted by plaintiff 614 is successfully dismissed by the defendant 606 or a court rules in favor of the defendant 606 with no stipulation of payment to the plaintiff 614, the lien obligation and related monies may no longer be payable by the plaintiff 614 to the owning entity of the lien network 617 or any other related parties of the lien network 600.

In 613, the plaintiff 614 is paid by the defendant 606 for the injury claim, excepting aforementioned and set aside lien monies 612, by the plaintiff 614.

Having received the lien monies, the owning entity of the lien network 617 arranges and thereby disperses the lien monies, that is, owed differential monies related to the recognized health provider—patient lien, specifically for redistribution within provisions of the lien network 600.

Prior to remittance of money to health provider member 603, the owning entity of the lien network 617, may make an optional payment 620 to itself as compensation per a negotiated arrangement in the lien network 600.

In 619, there may be optional payment made from the owning entity of the lien network 617 to the plaintiff 614, as a provision of the lien network 600.

In 621, the owning entity of the lien network 617 disperses a payment to health provider member 603, which constitutes a portion of lien monies from 612.

Furthermore, the amounts in 619, 620 and 621 equal the amount of lien monies set aside in 612, as so agreed between plaintiff 614 and the provision of the lien network 600.

Figure 7:
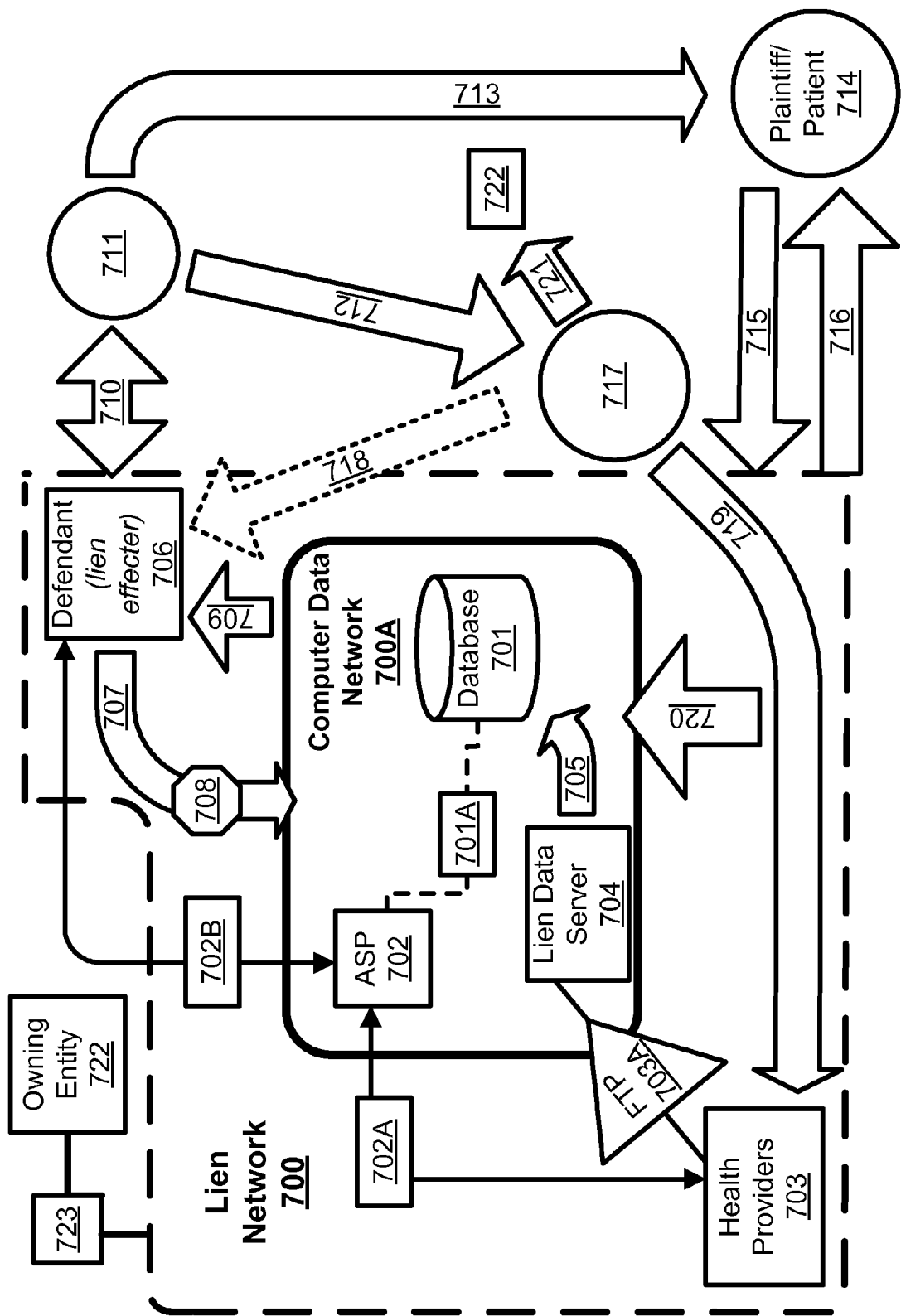
FIG. 7 is an illustration of a healthcare-related lien network via a business-to-business model with a defendant in a tort case as lien effecter, as per an aspect of an embodiment of the invention.

According to FIG. 7, a fourth embodiment of the system and method shows a business-to-business model reflecting an owning entity 722 of a member-based lien network 700, both linked through a legal, proprietary relationship 723. Members of the network 700 comprise health provider members 703 and defendants in a tort case 706.

While both the health provider members and defendant may be members, in this embodiment, the defendant 706 contracts as a temporary member to the lien network 700, through a limited agreement with the lien network.

Through membership in the lien network 700, both members 703 and 706 may be linked contractually to each other, as well as to the provisions, obligations and rules of membership set forth by the owning entity of the lien network 722.

Health provider members 703 may comprise, without being limited to, single or multiple physician practices, hospitals, outpatient clinics, medical testing centers, lab services, ambulatory services and radiological services, all inclusive equipment, services and medications as a part of their interactions with patients; furthermore, any single or multiple non-medical health providers of health-related treatment and/or services.

A typical tort action and/or court case has parties including a plaintiff 714 and a defendant 706. Both the plaintiff 714 and the defendant 706 may comprise, but not be solely limited to an individual, representing attorney, corporation, liability insurance company or other form of entity representing a tortfeasor, even if the tortfeasor is self-represented.

Health provider members 703 and defendant 706 may be individual, multiple, as a part of an association, corporation, membership or consortium.

Members 703 and 706 may or may not be charged a membership fee for being in the lien network 700.

Specifically, lien network 700 comprises a computer data network 700A, with a relational database 701, ASP based website and related server(s) 702, connection to transmit information between database and website 701A, a lien data server 704 as well as related connections therein.

Computer data network 700A may include, but is not limited to, any one or more of, for instance, the Internet, an intranet, a PAN (Personal Area Network), a LAN (Local Area Network), a WAN (Wide Area Network), a SAN (Storage Area Network), or a MAN (Metropolitan Area Network).

Database 701 may be one or more databases, including, or interfacing to, for example, an Oracle™ relational database sold commercially by Oracle Corporation. Other databases, such as Informix™, DB2 (Database 2) or other data storage or query formats, platforms, or resources such as OLAP (On Line Analytical Processing), SQL (Standard Query Language), a SAN (storage area network), Microsoft Access™ or others may also be used, incorporated, or accessed into the invention.

Lien data server 704 receives, communicates with and stores data from health provider members 703. Moreover, lien data server 704 may comprise one or more servers in number, including a workstation running Microsoft Windows™ NT™, Microsoft Windows™ 2000, Unix, Linux, Xenix, IBM, AIX™, Hewlett-Packard UX™, Novell Netware™, Sun Microsystems Solaris™, OS/2™, BeOS™, Mach, Apache, OpenStep,™ or other operating system or platform.

Health provider members 703 send their lien data electronically in a secure fashion through FTP communication 703A or other similar secure means to the computer data network's lien data server 704, designated to receive and store information only from health provider members 703.

Lien data may include, but not be solely limited to health provider member name, the health provider member's patients, billable patient services, dates of injury-related treatment, existence of a health provider—patient lien, amounts previously paid on treatment and related services, patient health insurance information—if applicable, HIPAA authorization, health related claim forms, identification of a registered patient's injury cause and a contingency-based health provider—patient lien, allowing for the collection of differential monies, identification of a registered patient's injury cause and attorney.

Lien data may also be known as "lien information", "patient claim information", "data" or "information" in relation to appropriate context.

In an alternative implementation, lien data from the health provider member 703 may also be provided to computer data network 700A via transfer of media including, for example, Blu-Ray disk, DVD, CD-ROM, memory stick, tape, disk, and/or other suitable removable media, wireless means, as well as paper records.

Lien data server 704 receives lien and patient claim information from health provider members 703; subsequently, lien data server 704 has the ability to communicate missing or needed information back to health provider members 703, when necessary. Moreover, lien data server 704 uploads the received information through secure means to the computer data network's relational database 701 through 705.

The uploaded information from lien data server 704 to the relational database 701 is sent in whole or partial form, depending on the use of analytics, software and specific data per specificity by relational database 701 as determined by the needs of computer data network 700A.

As a normal part of tort case management, plaintiff 714 submits an injury claim to defendant 706.

The tort claim submitted by the plaintiff 714 to the defendant 706 may contain bills from health-related care, treatment and services, given to the patient, who is also the plaintiff 714, by a health provider member 703.

Moreover, the bills related to these health services may be included within a financial instrument, such as a contingency-based health provider—patient lien, allowing for collection of owed differential monies to health provider member 703, made between the patient and a health provider member 703, prior to the rendering of services. The lien, already submitted by the health provider member 703 through 703A, may be held by the lien network 700, whereby the provider may assign rights to collection of the lien to the owning entity of the lien network 722, when placing the lien in the lien network's domain.

In 707, defendant 706 may query database 701; the query is made through ASP site 702 via 702B. There may or may not be a charge for the defendant 706 to pay the owning entity of the lien network 722 for the query.

The query allows the defendant 706 to determine a match of identity between the plaintiff 714 to any individual patient held within the database, related matched medical services and billings, and if those billings were included under a lien between the health provider member 703 and plaintiff/patient 714 at a time before such health services were rendered.

The computer data network 700A has an ASP based website and related server(s) 702, allowing members 703 and 706 to connect into the website through 702A and 702B respectfully, to a pre-arranged, evolving set of data and/or reports, as so allowed by the computer data network 700A, through the use of a GUI interface 701A or similar means, to pull only specific information kept at relational database 701. This may include, but is not limited to, need for additional information, changes in information, open and closed lien claims as well as current status of such.

However, before any data from the query of the defendant in 707 is released per 709 from the computer data network 700A to defendant 706 or any payment is accepted by lien network 700 from defendant 706, the defendant must sign a one-time, per case agreement 708 between itself and the lien network 700.

Agreement 708 legally binds the defendant 706, to honor both the existing health provider—patient lien held within the lien network 700, and all the provisions of being a member, albeit temporary, in the lien network 700. This in turn makes the defendant 706 the lien effecter of this business model.

Subsequent to the execution of agreement 708, the computer network 700A of the lien network 700 is able to accept query 707 from defendant 706 for lien data and related information.

If there is payment in 707, made from the defendant 706 to the owning entity of the lien network 722, it is for querying the computer data network 700A, and is not contingent upon receiving a match of information.

In 709, the defendant 706 receives a response as to whether or not there is a match between the plaintiff 714 and the patient of the health provider member 703, held within the computer data network 700A.

If a match exists, the defendant 706 agrees, as the lien effecter, to honor and set aside any lien-related monies, which would have been paid to the plaintiff.

When the plaintiff 714 and defendant 706 have negotiated the claim per 710 to an agreed amount 711, the defendant 706, now deemed the lien effecter, honors the existing lien between health provider member 703 and plaintiff/patient 714; furthermore, the defendant 706 alerts the plaintiff/patient 714 that the lien amount portion of the claim 712 will be paid through dispersal to the health provider member 703 and other parties, with the remaining monies remitted to the plaintiff/patient 714.

In 711, there exists an agreement between the defendant 706 and the plaintiff/patient 714, a judgment or award from a court, inclusive of setting aside appropriate lien monies, with the defendant 706 honoring and paying the lien amount 712 for eventual dispersal.

If the claim submitted by the plaintiff 714 is successfully dismissed by the defendant 706 or a court rules in favor of the defendant 706 with no stipulation of payment to the plaintiff 714, the lien obligation and related monies may no longer be payable by the defendant 706 to the health provider member 703 or any other related parties of the lien network 700.

In 713, the plaintiff/patient 714 is paid by the defendant 706 for the injury claim, excepting aforementioned and set aside lien monies 712, by the defendant 706.

In 717, the defendant 706 as lien effecter, arranges and thereby disperses the lien monies, that is, owed differential monies related to the recognized health provider—patient lien, specifically for redistribution within provisions of the lien network 700.

Prior to remittance of money to health provider member 703, the defendant 706, as lien effecter, through a negotiated arrangement per membership in and subscription to, the lien network 700, may take an optional, negotiated portion of lien monies 718 as part of compensation.

Another dispersal of lien monies in 721 may be given made to the owning entity 722 of lien network 700.

In 719, the defendant 706 disperses a payment to health provider member 703, which constitutes a portion of lien monies from 712.

Per 720, the computer data network 700A of the lien network 700 is made aware of both submission of payment by defendant 706 in 719, as well as receipt of payment by health provider member 703, through each member's responsibility to the lien network 700.

Additionally in 720, the defendant 706 verifies to the computer data network 700A of the lien network 700, that optional compensation payment 718 and payment to owning entity in 721 is in keeping with agreed upon rates within the provisions of the lien network 700.

In 715, the plaintiff/patient 714 requests verification from the lien network 700, that defendant 706 did in fact make payment related to lien per monies set aside in 712; moreover, that such payment 719, was received by health provider member 703.

Additionally, the request of 715 covers both defendant's optional compensation monies in 718 as well as owning entity compensation monies in 721.

In 716, a verification report from the lien network satisfies the provisions and request of 715. Furthermore, that the amounts in 718, 719 and 721 equal the amount of lien monies set aside in 712, as so agreed to between defendant 706 and plaintiff/patient 714 in 711.

Figure 8:
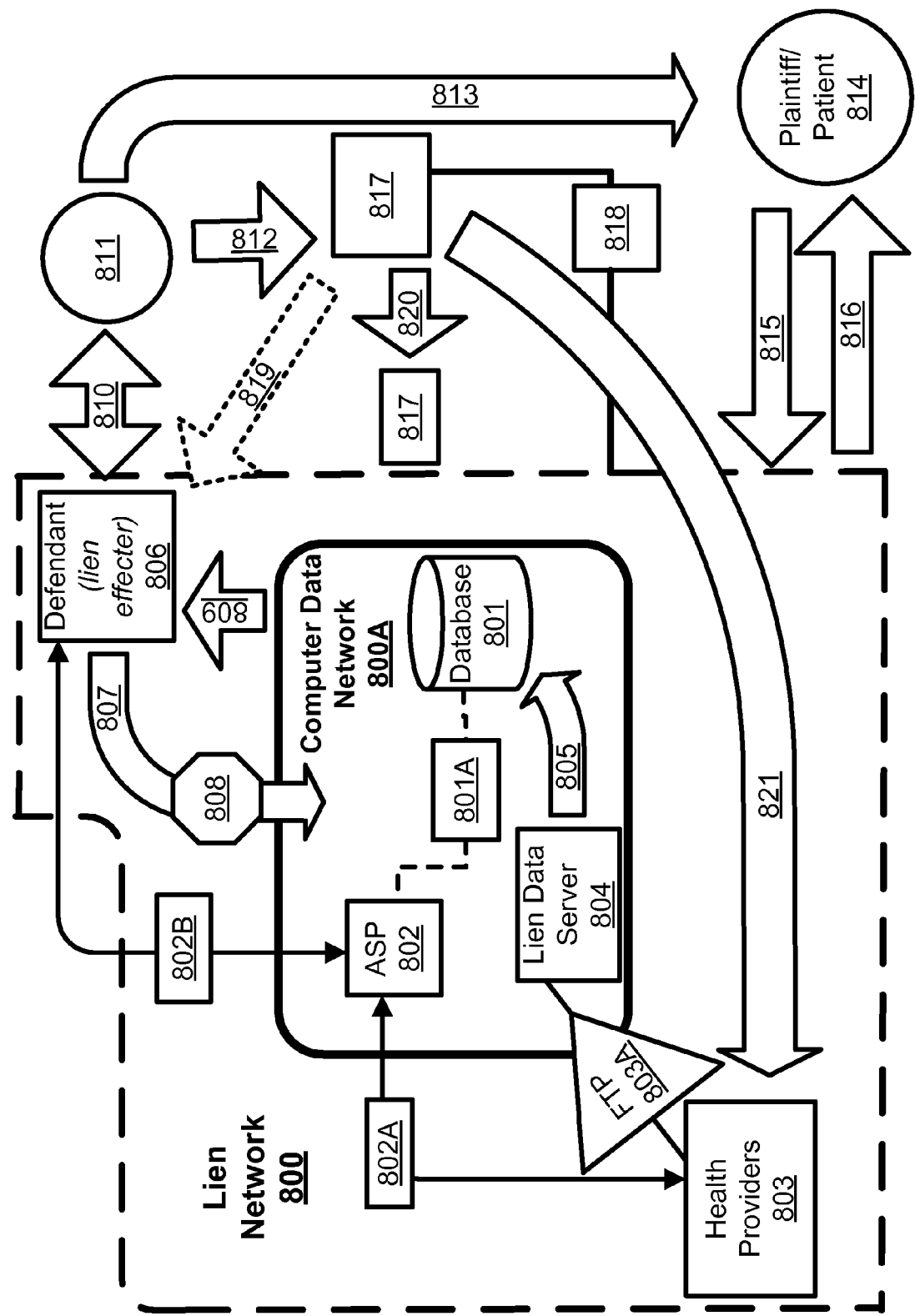
FIG. 8 is another illustration of a healthcare-related lien network via a business-to-business model with a defendant in a tort case as lien effecter, as per an aspect of an embodiment of the invention.

According to FIG. 8, a variation of the fourth embodiment of the system and method shows a business-to-business model reflecting an owning entity 817 of a member-based lien network 800, both linked through a legal, proprietary relationship 818. Members of the network 800 comprise health provider members 803 and defendants in a tort case 806.

While both the health provider members and defendant may be members, in this embodiment, the defendant 806 contracts as a temporary member to the lien network 800, through a limited agreement with the lien network.

Through membership in the lien network 800, both members 803 and 806 may be linked contractually to each other, as well as to the provisions, obligations and rules of membership set forth by the owning entity of the lien network 817.

Health provider members 803 may comprise, without being limited to, single or multiple physician practices, hospitals, outpatient clinics, medical testing centers, lab services, ambulatory services and radiological services, all inclusive equipment, services and medications as a part of their interactions with patients; furthermore, any single or multiple non-medical health providers of health-related treatment and/or services.

A typical tort action and/or court case has parties including a plaintiff 814 and a defendant 806. Both the plaintiff 814 and the defendant 806 may comprise, but not be solely limited to an individual, representing attorney, corporation, liability insurance company or other form of entity representing a tortfeasor, even if the tortfeasor is self-represented.

Health provider members 803 and defendant 806 may be individual, multiple, as a part of an association, corporation, membership or consortium.

Members 803 and 806 may or may not be charged a membership fee for being in the lien network 800.

Specifically, lien network 800 comprises a computer data network 800A, with a relational database 801, ASP based website and related server(s) 802, connection to transmit information between database and website 801A, a lien data server 804 as well as related connections therein.

Computer data network 800A may include, but is not limited to, any one or more of, for instance, the Internet, an intranet, a PAN (Personal Area Network), a LAN (Local Area Network), a WAN (Wide Area Network), a SAN (Storage Area Network), or a MAN (Metropolitan Area Network).

Database 801 may be one or more databases, including, or interfacing to, for example, an Oracle™ relational database sold commercially by Oracle Corporation. Other databases, such as Informix™, DB2 (Database 2) or other data storage or query formats, platforms, or resources such as OLAP (On Line Analytical Processing), SQL (Standard Query Language), a SAN (storage area network), Microsoft Access™ or others may also be used, incorporated, or accessed into the invention.

Lien data server 804 receives, communicates with and stores data from health provider members 803. Moreover, lien data server 804 may comprise one or more servers in number, including a workstation running Microsoft Windows™ NT™, Microsoft Windows™ 2000, Unix, Linux, Xenix, IBM, AIX™, Hewlett-Packard UX™, Novell Netware™, Sun Microsystems Solaris™, OS/2™, BeOS™, Mach, Apache, OpenStep,™ or other operating system or platform.

Health provider members 803 send their lien data electronically in a secure fashion through FTP communication 803A or other similar secure means to the computer data network's lien data server 804, designated to receive and store information only from health provider members 803.

Lien data may include, but not be solely limited to health provider member name, the health provider member's patients, billable patient services, dates of injury-related treatment, existence of a health provider—patient lien, amounts previously paid on treatment and related services, patient health insurance information—if applicable, HIPAA authorization, health related claim forms, identification of a registered patient's injury cause and a contingency-based health provider—patient lien, allowing for the collection of differential monies, identification of a registered patient's injury cause and attorney.

Lien data may also be known as "lien information", "patient claim information", "data" or "information" in relation to appropriate context.

In an alternative implementation, lien data from the health provider member 803 may also be provided to computer data network 800A via transfer of media including, for example, Blu-Ray disk, DVD, CD-ROM, memory stick, tape, disk, and/or other suitable removable media, wireless means, as well as paper records.

Lien data server 804 receives lien information from health provider members 803; subsequently, lien data server 804 has the ability to communicate missing or needed information back to health provider members 803, when necessary. Moreover, lien data server 804 uploads the received information through secure means to the computer data network's relational database 801 through 805.

The uploaded information from lien data server 804 to the relational database 801 is sent in whole or partial form, depending on the use of analytics, software and specific data per specificity by relational database 801 as determined by the needs of computer data network 800A.

As a normal part of tort case management, plaintiff 814 submits a tort claim to defendant 806.

The injury claim submitted by the plaintiff/patient 814 to the defendant 806 may contain bills from health-related care, treatment and services, given to the patient by a health provider member 803.

Moreover, the bills related to these health services may be included within a financial instrument, such as a contingency-based health provider—patient lien, allowing for collection of owed differential monies to health provider member 803, made between the plaintiff/patient 814 and a health provider member 803, prior to the rendering of services. The lien, already submitted by the health provider member 803 through 803A, may be held by the lien network 800, whereby the provider may assign rights to collection of the lien to the owning entity of the lien network 817, when placing the lien in the lien network's domain.

In 807, defendant 806 may query database 801; the query is made through ASP site 802 via 802B. There may or may not be a charge for the defendant 806 to pay the owning entity of the lien network 817 for the query.

The query allows the defendant 806 to determine a match of identity between the plaintiff 814 to any individual patient held within the database, related matched medical services and billings, and if those billings were included under a lien between the health provider member 803 and plaintiff/patient 814 at a time before such health services were rendered.

The computer data network 800A has an ASP based website and related server(s) 802, allowing members 803 and 806 to connect into the website through 802A and 802B respectfully, to a pre-arranged, evolving set of data and/or reports, as so allowed by the computer data network 800A, through the use of a GUI interface 801A or similar means, to pull only specific information kept at relational database 801. This may include, but is not limited to, need for additional information, changes in information, open and closed lien claims as well as current status of such.

However, before any data from the query of the defendant in 807 is released per 809 from the computer data network 800A to defendant 806 or any payment is accepted by lien network 800 from defendant 806, the defendant must sign a one-time, per case agreement 808 between itself and the lien network 800.

Agreement 808 legally binds the defendant 806, to honor both the existing health provider—patient lien held within the lien network 800, and all the provisions of being a member, albeit temporary, in the lien network 800. This in turn makes the defendant 806 the lien effecter of this business model.

Subsequent to the execution of agreement 808, the computer network 800A of the lien network 800 is able to accept query 807 from defendant 806 for lien data and related information.

If there is payment in 807, made from the defendant 806 to the owning entity of the lien network 817, it is for querying the computer data network 800A, and is not contingent upon receiving a match of information.

However, when lien data held by the database 801 matches up with injury claims data held by the defendant 806, the defendant may, as shown in 809, use the lien data with inclusive patient lien and medical billing information to better negotiate, reduce or eliminate payment for injury claims by leveraging existing owed differential monies under an existing lien against monies sought through a liability claim by plaintiff 814, whereby the plaintiff is also a patient 814 of the health provider member 803.

In 809, the defendant 806 receives a response as to whether or not there is a match between the plaintiff 814 and the patient of the health provider member 803, held within the computer data network 800A.

If a match exists, the defendant 806 agrees, as the lien effecter, to honor and set aside any lien-related monies, which would have been paid to the plaintiff.

When the plaintiff 814 and defendant 806 have negotiated the claim per 810 to an agreed amount 811, the defendant 806, now deemed the lien effecter, honors the existing lien between health provider member 803 and patient 814; furthermore, alerting the plaintiff/patient 814 that the lien amount portion of the claim 812 will be paid through dispersal to the health provider member 803 and other parties, with the remaining monies remitted to the plaintiff/patient 814.

In 811, there exists an agreement between the defendant 806 and the plaintiff/patient 814, a judgment or award from a court, inclusive of setting aside appropriate lien monies, with the defendant 806 honoring and paying the lien amount 812 for eventual dispersal.

If the claim submitted by the plaintiff 814 is successfully dismissed by the defendant 806 or a court rules in favor of the defendant 806 with no stipulation of payment to the plaintiff 814, the lien obligation and related monies may no longer be payable by the defendant 806 to the owning entity of the lien network 817 or any other related parties of the lien network 800.

In 813, the plaintiff/patient 814 is paid by the defendant 806 for the injury claim, excepting aforementioned and set aside lien monies 812, by the defendant 806.

In 812, which may occur before or after the defendant's payment 813 to the plaintiff/patient 814, the defendant 806 makes a payment of lien monies to the owning entity of the lien network 817.

Subsequent to its receipt of monies, in 819 the owning entity 817 remits an optional portion of lien monies back to defendant 806 per defendant's compensation as lien effecter.

In 820, the owning entity 817 takes a pre-arranged portion of lien monies as compensation for itself.

After compensation from the lien monies has been paid to both the defendant, if applicable in 819 and the owning entity 817, the owning entity pays the remaining portion of the lien monies in 821 to the health provider member 803.

In 815, the plaintiff/patient 814 requests verification from the lien network 800, that defendant 806 did in fact set aside lien monies per 812; moreover, that payment to the health provider member per 821, was made by the owning entity 817 and received by health provide member 803;

Additionally, the request of 815 covers both optional defendant monies in 819 as well as owning entity compensation monies in 820.

A verification report 816, from the lien network satisfies the provisions and request of 815. Furthermore, that the amounts in 819, 820 and 821 equals the amount of lien monies set aside in 812.

Figure 9:
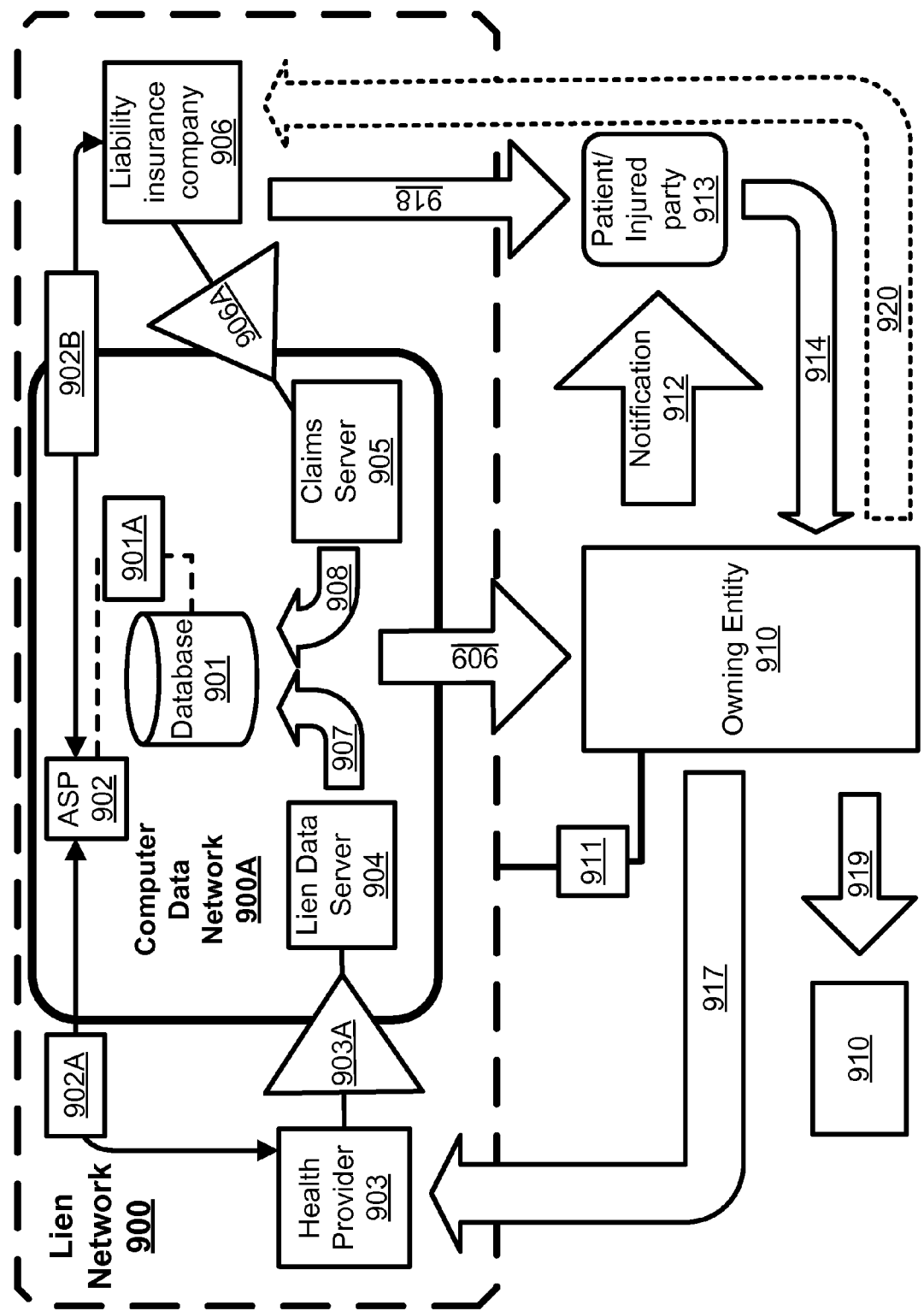
FIG. 9 is an illustration of a healthcare-related lien network via a business-to-consumer model with a liability insurance company as the responsible payment party, as per an aspect of an embodiment of the invention.

According to FIG. 9, a fifth embodiment of the system and method shows a business-to-consumer model reflecting an owning entity 910 of a member-based lien network 900, both linked through a legal, proprietary relationship 911. Members of the network 900 may comprise health providers 903 and liability insurance companies 906.

Through membership in the lien network 900, both members 903 and 906 are linked contractually to each other, as well as to the provisions, obligations and rules of membership of the lien network, including, but not limited to negotiated reimbursement rates, fees, actions and consequences, etc. set forth by the owning entity of the lien network 910.

Health provider members 903 may comprise, without being limited to, single or multiple physician practices, hospitals, outpatient clinics, medical testing centers, lab services, ambulatory services, radiological services and those entities, which provide medical equipment and pharmaceutical products as part of interaction and related care provider to and for patients; additionally, any single or multiple non-medical health providers of health-related treatment and/or services.

Liability insurance company members 906 represent all types of insurance companies, who, through their insurance policies, are financially liable when their policyholders become tortfeasors in an injury claim; whereby, policyholders are inclusive of, but not solely limited to individuals, businesses, associations, public companies and organizations deemed responsible for actions causing injury to a separate party.

Members 903 and 906 may represent an individual and/or plurality of legally organized and recognized entities within the health care and liability insurance industries—be they sole proprietorship, corporation, partnership, limited liability company, membership, association or other legally-recognized consortium.

Members 903 and 906 may or may not be charged a membership fee for being in the lien network 900.

Lien network 900 comprises a computer data network 900A, with a relational database 901, ASP based website and related server(s) 902, a secure connection to transmit information between database and website 901A, means to send and receive communication through 902A and 902B to members 903 and 906 respectively, as well as several independent servers, that may constitute a lien data server 904 and injury claims server 905.

Computer data network 900A may include, but not specifically be limited to, any one or more of, for instance, the Internet, an intranet, a PAN (Personal Area Network), a LAN (Local Area Network), a WAN (Wide Area Network), a SAN (Storage Area Network), or a MAN (Metropolitan Area Network).

Database 901 may be one or more databases, including, or interfacing to, for example, an Oracle™ relational database sold commercially by Oracle Corporation. Other databases, such as Informix™, DB2 (Database 2) or other data storage or query formats, platforms, or resources such as OLAP (On Line Analytical Processing), SQL (Standard Query Language), a SAN (storage area network), Microsoft Access™ or others may also be used, incorporated, or accessed into the invention.

Servers 904 and 905 receive, communicate with and store lien and injury data from members 903 and 906 respectively. Moreover, servers 904 and 905 may not be limited in number and may comprise workstations running Microsoft Windows™ NT™, Microsoft Windows™ 2000, Unix, Linux, Xenix, IBM, AIX™, Hewlett-Packard UX™, Novell Netware™, Sun Microsystems Solaris™, OS/2™, BeOS™, Mach, Apache, OpenStep,™ or other operating systems or platforms.

Health provider member 903 sends lien data in a secure fashion through FTP communication 903A or other similar secure means to the computer data network's lien data server 904, designated to receive and store information solely from health provider member.

Lien data may include, but not be solely limited to health provider member identity, contact and related identifying information; the health provider's patients, including identifying information for the patients such as, but not solely limited to patient's identity, related private health information, billable services, dates of injury-related treatment, existence of a health provider—patient lien or other legally binding agreements, amounts previously paid on treatment and related services, patient health insurance information—if applicable, HIPAA authorization, health related claim forms, a contingency-based health provider—patient lien, allowing for the collection of differential monies, identification of a registered patient's injury cause and attorney.

Lien data may also be known as "lien information", "patient claim information", "data" or "information" in relation to appropriate context.

The liability insurance companies 906 submit open and closed injury claim information and related personal identifying data through FTP communication 906A or other similar secure means to the computer data network's Liability claims server 905, which receives and stores information only from liability insurance companies.

Injury claim information may include, but not be solely limited to the injured party's identity, contact information as well as their private health information—inclusive of billable services from all health provider and dates of related medical services relating to the injured party's care stemming from a tort-related injury, whereby said information constitutes a part or whole valuation to their injury claim filed to the related liability insurance company member 906.

In an alternative implementation, lien data from the health provider member 903 and injury claim information from the liability insurance company 906 may also be provided to the computer data network 900A via transfer of media including, for example, Blu-Ray disk, DVD, CD-ROM, memory stick, tape, disk, and/or other suitable removable media, wireless means, as well as paper records.

Servers 904 and 905 receive lien data and injury claim information from members 903 and 906 respectively; subsequently, 903A and 906A allow for members 903 and 906 to evaluate information they have uploaded, so they may determine completeness and accuracy of the data housed in servers 904 and 905.

Moreover, servers 904 and 905 upload the received information independently and through secure means to the computer data network's relational database 901 through 907 and 908 respective from servers 904 and 905.

The Computer Data Network 900A of the lien network 900 has an ASP based website and related server(s) 902, which allows members 903 and 906 to connect into the website through 902A and 902B respectfully, to a pre-arranged, evolving set of data and/or reports, as so allowed by the computer data network 900A through the use of a GUI interface or similar means. This may include, but may not specifically be limited to, need for additional information, changes in information, open and closed lien claims, matched identities, as well as status of such.

Members 903 and 906 may utilize reports and/or data kept by relational database 901, with or without paying a fee for such, as determined by the owning entity of the lien network 910.

The uploaded information from either server to the relational database 901 may be in whole or partial form, depending on the use of analytics, software and specific data needed by relational database 901 as determined by the needs of the computer data network 900A.

Upon the transmission of both lien data and claim information via 907 and 908 to relational database 901, the two sets of data are compared, enabling recognition of a match of identity, which may exist between the injured party 913 and the patient 913.

If there is a match of identities, the computer network 900A further determines if treatment service information within the lien data matches with treatment services within the injury claim information; subsequently, there is also a determination if the patient 913 of the health provider member 903 has signed a health provider—patient lien allowing for the collection of owed differential monies.

If such a match of identity, treatment services and existence of lien exists, the owning entity 910 contacts the liability insurance company member 906 through 902B or other means, requesting per lien network rules, that the liability insurance company member 906 makes known the status of injury claim payment and provides owning entity 910 any related monetary amounts paid by the insurance company member in 918 to patient/injured party 913.

Once the above injury claim information is obtained, owning entity 910 may contact health provider member 903 to obtain amounts already shown paid on the indicated treatment services, held under the lien.

Upon obtaining the financial information from members 903 and 906, the owning entity 910, now deemed the lien effecter, subsequently effects means in 912 to notify the patient/injured party 913 of the obligation of the health provider—patient lien and the differential lien money amounts owing therein to the health provider member 903.

Subsequently, in 914, the owning entity 110 collects owed differential monies related to the health provider—patient lien (herein "lien monies") from the patient/injured party 913.

Having received the lien monies, the owning entity of the lien network 910 arranges and thereby disperses the lien monies, that is, owed differential monies related to the recognized health provider—patient lien, specifically for redistribution within provisions of the lien network 900.

Prior to remittance of money to health provider member 903, the owning entity of the lien network 910, may make an optional payment 919 to itself as compensation per a negotiated arrangement in the lien network 900.

In 920, there may be optional payment made from the owning entity of the lien network 910 to the liability insurance company member 906, as a provision of its membership in the lien network 900.

In 917, the owning entity of the lien network 910 disperses a payment to health provider member 903, which constitutes a portion of lien monies from 914.

Furthermore, the amounts in 917, 919 and 920 equal the amount of lien monies set aside in 914, per the provision of the lien network 900.

Figure 10:
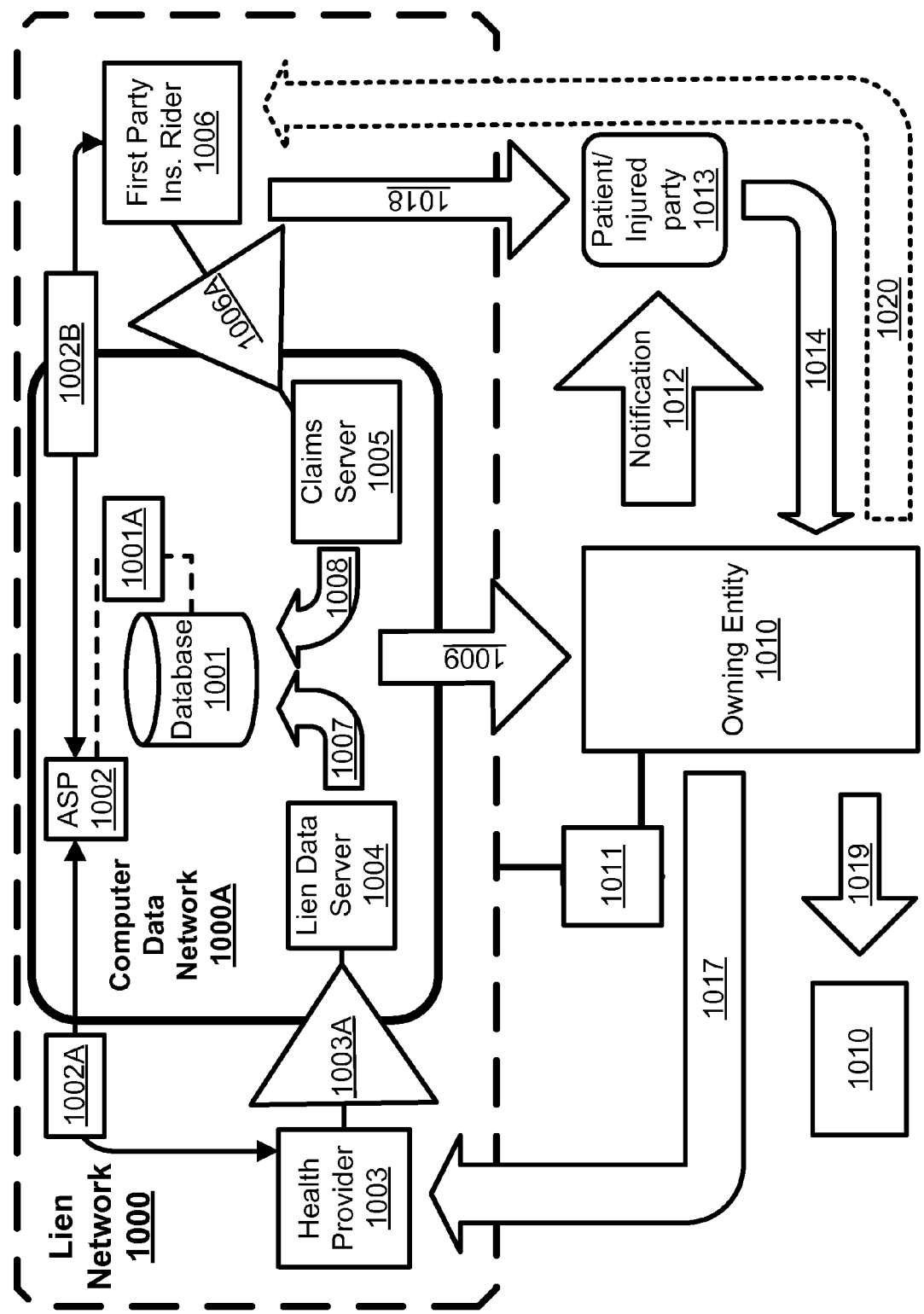
FIG. 10 is another illustration of a healthcare-related lien network via a business-to-consumer model with a first party health rider as a responsible payment party, as per an aspect of an embodiment of the invention.

According to FIG. 10, a sixth embodiment of the system and method shows a business-to-consumer model reflecting an owning entity 1010 of a member-based lien network 1000, both linked through a legal, proprietary relationship 1011. Members of the network 1000 may comprise health providers 1003 and the division of a liability insurance company representing first party insurance riders 1006.

Through membership in the lien network 1000, both members 1003 and 1006 are linked contractually to each other, as well as to the provisions, obligations and rules of membership of the lien network, including, but not limited to negotiated reimbursement rates, fees, actions and consequences, etc. set forth by the owning entity of the lien network 1010.

Health provider members 1003 may comprise, without being limited to, single or multiple physician practices, hospitals, outpatient clinics, medical testing centers, lab services, ambulatory services, radiological services and those entities, which provide medical equipment and pharmaceutical products as part of interaction and related care provider to and for patients; additionally, any single or multiple non-medical health providers of health-related treatment and/or services.

First party insurance riders 1006 are portions of an insurance policy, in which the policyholder adds-on, in order to compliment their insurance product coverage. Specifically, first party riders cover a policyholder's health care and treatment if they become an injured party when the policyholder is responsible for the injury or, the responsible party, which caused the injury to the policyholder does not have insurance coverage, which would pay for the injured party's health care and treatment resulting from the injury.

Examples of applicable first-party riders to this embodiment include, but are not limited to no-fault, PIP, Med Pay, underinsured and uninsured motorist. However, non-auto insurance policies may also have first-party riders, applicable in certain situations to cover a policyholder's health care and treatment from injury, which has coverage through such an underlying insurance policy.

Members 1003 and 1006 may represent an individual and/or plurality of legally organized and recognized entities within the health care and liability insurance industries—be they sole proprietorship, corporation, partnership, limited liability company, membership, association or other legally-recognized consortium.

Members 1003 and 1006 may or may not be charged a membership fee for being in the lien network 1000.

Lien network 1000 comprises a computer data network 1000A, with a relational database 1001, ASP based website and related server(s) 1002, a secure connection to transmit information between database and website 1001A, means to send and receive communication through 1002A and 1002B to members 1003 and 1006 respectively, as well as several independent servers, that may constitute a lien data server 1004 and injury claims server 1005.

Computer data network 1000A may include, but not specifically be limited to, any one or more of, for instance, the Internet, an intranet, a PAN (Personal Area Network), a LAN (Local Area Network), a WAN (Wide Area Network), a SAN (Storage Area Network), or a MAN (Metropolitan Area Network).

Database 1001 may be one or more databases, including, or interfacing to, for example, an Oracle™ relational database sold commercially by Oracle Corporation. Other databases, such as Informix™, DB2 (Database 2) or other data storage or query formats, platforms, or resources such as OLAP (On Line Analytical Processing), SQL (Standard Query Language), a SAN (storage area network), Microsoft Access™ or others may also be used, incorporated, or accessed into the invention.

Servers 1004 and 1005 receive, communicate with and store lien and injury data from members 1003 and 1006 respectively. Moreover, servers 1004 and 1005 may not be limited in number and may comprise workstations running Microsoft Windows™ NT™, Microsoft Windows™ 2000, Unix, Linux, Xenix, IBM, AIX™, Hewlett-Packard UX™, Novell Netware™, Sun Microsystems Solaris™, OS/2™, BeOS™, Mach, Apache, OpenStep,™ or other operating systems or platforms.

Health provider member 1003 sends lien data in a secure fashion through FTP communication 1003A or other similar secure means to the computer data network's lien data server 1004, designated to receive and store information solely from health provider member.

Lien data may include, but not be solely limited to health provider member identity, contact and related identifying information; the health provider's patients, including identifying information for the patients such as, but not solely limited to patient's identity, related private health information, billable services, dates of injury-related treatment, existence of a health provider—patient lien or other legally binding agreements, amounts previously paid on treatment and related services, patient health insurance information—if applicable, HIPAA authorization, health related claim forms, a contingency-based health provider—patient lien, allowing for the collection of differential monies, identification of a registered patient's injury cause and attorney.

Lien data may also be known as "lien information", "patient claim information", "data" or "information" in relation to appropriate context.

The first party rider members 1006 submit open and closed injury claim information and related personal identifying data through FTP communication 1006A or other similar secure means to the computer data network's liability claims server 1005, which receives and stores information only from first party insurance riders.

Injury claim information may include, but not be solely limited to the injured party's identity, contact information as well as their private health information—inclusive of billable services from all health provider and dates of related medical services relating to the injured party's care stemming from a tort-related injury, whereby said information constitutes a part or whole valuation to their injury claim filed to the related first party rider member 1006.

In an alternative implementation, lien data from the health provider member 1003 and injury claim information from first party rider member 1006 may also be provided to the computer data network 1000A via transfer of media including, for example, Blu-Ray disk, DVD, CD-ROM, memory stick, tape, disk, and/or other suitable removable media, wireless means, as well as paper records.

Servers 1004 and 1005 receive lien data and injury claim information from members 1003 and 1006 respectively; subsequently, 1003A and 1006A allow for members 1003 and 1006 to evaluate information they have uploaded, so they may determine completeness and accuracy of the data housed in servers 1004 and 1005.

Moreover, servers 1004 and 1005 upload the received information independently and through secure means to the computer data network's relational database 1001 through 1007 and 1008 respective from servers 1004 and 1005.

The Computer Data Network 1000A of the lien network 1000 has an ASP based website and related server(s) 1002, which allows members 1003 and 1006 to connect into the website through 1002A and 1002B respectfully, to a pre-arranged, evolving set of data and/or reports, as so allowed by the computer data network 1000A through the use of a GUI interface or similar means. This may include, but may not specifically be limited to, need for additional information, changes in information, open and closed lien claims, matched identities, as well as status of such.

Members 1003 and 1006 may utilize reports and/or data kept by relational database 1001, with or without paying a fee for such, as determined by the owning entity of the lien network 1010.

The uploaded information from either server to the relational database 1001 may be in whole or partial form, depending on the use of analytics, software and specific data needed by relational database 1001 as determined by the needs of the computer data network 1000A.

Upon the transmission of both lien data and claim information via 1007 and 1008 to relational database 1001, the two sets of data are compared, enabling recognition of a match of identity, which may exist between the injured party 1013 and the patient 1013.

If there is a match of identities, the computer network 1000A further determines if treatment service information within the lien data matches with treatment services within the injury claim information; subsequently, there is also a determination if the patient 1013 of the health provider member 1003 has signed a health provider—patient lien allowing for the collection of owed differential monies.

If such a match of identity, treatment services and existence of lien exists, the owning entity 1010 contacts the first party rider member 1006 through 1002B or other means, requesting per lien network rules, that the first party rider member 1006 makes known the status of injury claim payment and provides owning entity 1010 any related monetary amounts paid by the first party rider member in 1018 to patient/injured party 1013.

Once the above injury claim information is obtained, owning entity 1010 may contact health provider member 1003 to obtain amounts already paid on the indicated treatment services, held under the lien.

Once obtaining the financial information from members 1003 and 1006, the owning entity 1010, now deemed the lien effecter, subsequently effects means in 1012 to notify the patient/injured party 1013 of the obligation of the health provider—patient lien and the differential lien money amounts owing therein to the health provider member 1003.

Subsequently, in 1014, the owning entity 1010 collects owed differential monies related to the health provider—patient lien (herein "lien monies") from the patient/injured party 1013.

Having received the lien monies, the owning entity of the lien network 1010 arranges and thereby disperses the lien monies, that is, owed differential monies related to the recognized health provider—patient lien, specifically for redistribution within provisions of the lien network 1000.

Prior to remittance of money to health provider member 1003, the owning entity of the lien network 1010, may make an optional payment 1019 to itself as compensation per a negotiated arrangement in the lien network 1000.

In 1020, there may be optional payment made from the owning entity of the lien network 1010 to the first party rider member 1006, as a provision of its membership in the lien network 1000.

In 1017, the owning entity of the lien network 1010 disperses a payment to health provider member 1003, which constitutes a portion of lien monies from 1014.

Furthermore, the amounts in 1017, 1019 and 1020 equal the amount of lien monies set aside in 1014, per the provision of the lien network 1000.

While various embodiments of the present invention have been described above, it should be understood that they have been presented by way of example, and not limitation. It will be apparent to persons skilled in the relevant art that various changes in form and detail can be made therein without departing from the spirit and scope of the present invention. In fact, after reading the above description, it will be apparent to one skilled in the relevant art how to implement the invention in alternative embodiments. Thus, the present invention should not be limited by any of the above described examples.

In addition, it should be understood that any figures, schematic diagrams, system diagrams, or examples that highlight the functionality and advantages of the present invention, are presented for example purposes only. The architecture of the present invention is sufficiently flexible and configurable, such that it may be utilized in ways other than that shown.

Furthermore, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

Furthermore, it is the applicant's intent that only claims that include the express language means for or step for be interpreted under 35 U.S.C. 112, paragraph 6. Claims that do not expressly include the phrase means for or step for are not to be interpreted under 35 U.S.C. 112, paragraph 6.

The scope of the present invention is limited only by the claims as follows:

What is claimed is:

1. A non-transitory computer readable medium containing a series of instructions, that when executed by one or more processors, causes the one or more processors to perform a method of managing health provider liens, the method comprising:
   a) receiving a lien, wherein the lien is a financial instrument made between a patient and a health provider, specifically for differential monies, wherein the lien includes identifying information of the health provider and patient, wherein the lien includes the health provider's financial record information on the patient, wherein the lien has been created by:
      i. the health care provider and the patient entering into a private billing contract for differential monies, wherein the differential monies are the difference between the normal and full charge for the rendered health care services, and the contractual rate payment made by the health insurance plan in response to the health care service bill, wherein the differential monies are only due to the health provider upon the patient submitting the health care service bill to an additional party and receiving payment therefrom; submitting via the patient the health care service bill to the additional payment party;
      ii. transmitting a health care service bill from the health provider to the patient's health insurance plan for health care services provided to the patient by the health care provider, wherein the health care service bill is for the normal and full charge for the rendered health care services;
      iii. the health provider accepting a contractual rate payment from the health insurance plan in response to the transmitted health care service bill, wherein the contractual rate payment is lower than the health care provider's normal and full charge for the rendered health care services;

iv. determining that an additional payment party exists, which is not the patient's health insurance plan, wherein the additional payment party is responsible to pay the patient for the health care service bill, when submitted by the patient, irrespective of the patient's health insurance plan paying the health care provider for the same health care service bill;

v. receiving, by the patient, from the additional payment party monies in response to the submitted health care service bill, wherein the received monies includes differential monies; billing and collecting the differential monies from the patient by the health care provider based upon the private billing contract; and vi. wherein the prior steps are performed by one or more computers;

b) and calculating differential monies owed to the health provider under the lien, wherein the differential monies are the difference between the normal and full charge for the rendered health care services, and the lower contractual rate payment made by the health insurance plan in response to the health care service bill, wherein the differential monies are due to the health provider upon the patient submitting the health care service bill to a non-health plan payment party and receiving payment therefrom.

2. The non-transitory computer readable medium in claim 1, wherein the identifying information of the health provider and patient includes at least one of the following:
   a) the health provider's name;
   b) the health provider's address;
   c) the health provider's insurance identification numbers;
   d) the patient's name;
   e) the patient's address;
   f) the patient's social security number;
   g) the patient's birth date; or
   h) a combination of the above.

3. The non-transitory computer readable medium in claim 1, wherein the health provider's financial record information on the patient includes at least one of the following:
   a) the health provider's treatment billings;
   b) a record of payments made to the health provider from the patient's health plan;
   c) dates of treatment service;
   d) Current Procedural Terminology (CPT) coding;
   e) International Classification of Disease (ICD) coding; or
   f) a combination of the above.

4. The non-transitory computer readable medium in claim 1, wherein health providers include at least one of the following:
   a) physician practices;
   b) hospitals;
   c) outpatient clinics;
   d) medical testing centers;
   e) lab services;
   f) ambulatory services;
   g) radiological services;
   h) equipment, services and medications as a part of a health provider's interactions with patients; or
   i) a combination of the above.

5. The non-transitory computer readable medium in claim 1, wherein the lien is a mandated lien afforded to the health provider through applicable federal or state law.

6. The non-transitory computer readable medium in claim 1, wherein the health provider who submits the lien assigns the financial rights of collection upon the lien to a third party operating the non-transitory computer readable medium.

7. The non-transitory computer readable medium in claim 1, wherein the party submitting the search request on a claimant is under obligation to set aside monies to the claimant's health provider within the lien, contingent upon the claimant being identified from the party's search request.

8. The non-transitory computer readable medium in claim 1, wherein after a claimant is identified within the party's search request, the health provider receives demographic information about the party who made the search request and the existence of the patient as a claimant.

9. The non-transitory computer readable medium in claim 1, wherein an injury claim is an individual, group or class action tort, relating to at least one of the following:
   a) assault;
   b) battery;
   c) infliction of mental distress;
   d) medical malpractice;
   e) motor vehicle accident;
   f) personal injury;
   g) poisoning;
   h) toxicity;
   i) wrongful death;
   j) slips and falls;
   k) product liability;
   l) pharmaceutical liability;
   m) any action from a tortfeasor that is at least deemed to have caused injury to an individual or group, where the injury required the rendering of health-related services; or
   n) a combination of the above.

10. The non-transitory computer readable medium in claim 1, wherein a responsible payer is at least one of the following:
    a) a Property and Casualty (P&C) insurer;
    b) a liability insurer;
    c) a captive insurer;
    d) a self-insured tortfeasor;
    e) a no-fault insurer who is one of the following:
       i) MedPay
       ii) Personal Injury Protection (PIP)
       iii) Uninsured Motorist (UM)
       iv) Underinsured Motorist (UIM)
       v) a first party health benefit attached to an insurance product covering the patient's injuries; or
       vi) a combination of the above
    f) a individual, group, membership, association or other entity, who is a non-insured tortfeasor, and is financially responsible in its own capacity; or
    g) a combination of the above.

11. The non-transitory computer readable medium in claim 1, further comprising instructions for the method steps of:
    c) analyzing the stored identifying information of the health provider and patient, as well as the health provider's financial record of the patient;
    d) determining missing and needed identifying information of the health provider and patient, as well as the health provider's financial record of the patient;
    e) requesting the missing and needed identifying information of the health provider and patient, as well as the health provider's financial record of the patient;
    f) receiving the missing and needed identifying information of the health provider and patient, as well as the health provider's financial record of the patient.

12. A non-transitory computer readable medium containing a series of instructions, that when executed by one or more processors, causes the one or more processors to perform a method of managing health provider liens, the method comprising:

a) receiving a lien, wherein the lien is a financial instrument made between a patient and a health provider, specifically for differential monies, wherein the lien includes identifying information of the health provider and patient, wherein the lien includes the health provider's financial record information on the patient, wherein the lien has been created by:
  i. the health care provider and the patient entering into a private billing contract for differential monies, wherein the differential monies are the difference between the normal and full charge for the rendered health care services, and the contractual rate payment made by the health insurance plan in response to the health care service bill, wherein the differential monies are only due to the health provider upon the patient submitting the health care service bill to an additional party and receiving payment therefrom; submitting via the patient the health care service bill to the additional payment party;
  ii. transmitting a health care service bill from the health provider to the patient's health insurance plan for health care services provided to the patient by the health care provider, wherein the health care service bill is for the normal and full charge for the rendered health care services;
  iii. the health provider accepting a contractual rate payment from the health insurance plan in response to the transmitted health care service bill, wherein the contractual rate payment is lower than the health care provider's normal and full charge for the rendered health care services;
  iv. determining that an additional payment party exists, which is not the patient's health insurance plan, wherein the additional payment party is responsible to pay the patient for the health care service bill, when submitted by the patient, irrespective of the patient's health insurance plan paying the health care provider for the same health care service bill;
  v. receiving, by the patient, from the additional payment party monies in response to the submitted health care service bill, wherein the received monies includes differential monies; billing and collecting the differential monies from the patient by the health care provider based upon the private billing contract; and
  vi. wherein the prior steps are performed by one or more computers;
b) and calculating differential monies owed to the health provider under the lien, wherein the differential monies are the difference between the normal and full charge for the rendered health care services, and the lower contractual rate payment made by the health insurance plan in response to the health care service bill, wherein the differential monies are due to the health provider upon the patient submitting the health care service bill to a non-health plan payment party and receiving payment therefrom.

13. The non-transitory computer readable medium in claim 12, wherein a portion of collected set aside monies is distributed to the health provider.

14. The non-transitory computer readable medium in claim 12, wherein a portion of collected set aside monies is distributed to the party, who submitted the search request.

15. The non-transitory computer readable medium in claim 12, wherein a portion of collected set aside monies is kept by the party operating the non-transitory computer readable medium.

16. The non-transitory computer readable medium in claim 12, wherein upon the patient making a set aside payment to the health provider directly, the health provider remits a portion of the set aside payment back to the party operating the non-transitory computer readable medium.

* * * * *